US012111690B2

(12) United States Patent
Faaborg et al.

(10) Patent No.: US 12,111,690 B2
(45) Date of Patent: Oct. 8, 2024

(54) MANAGING DISPLAY CONTENT ON A WEARABLE DEVICE USING A CONVERSATION GRAPH

(71) Applicant: Google LLC, Mountain View, CA (US)

(72) Inventors: Alexander James Faaborg, Mountain View, CA (US); Michael Schoenberg, San Francisco, CA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 18/246,448

(22) PCT Filed: Sep. 30, 2020

(86) PCT No.: PCT/US2020/053449
§ 371 (c)(1),
(2) Date: Mar. 23, 2023

(87) PCT Pub. No.: WO2022/071936
PCT Pub. Date: Apr. 7, 2022

(65) Prior Publication Data

US 2023/0359241 A1 Nov. 9, 2023

(51) Int. Cl.

*G06F 1/16* (2006.01)
*G06F 3/00* (2006.01)
*G06F 3/01* (2006.01)
*G06F 3/14* (2006.01)
*G06F 3/16* (2006.01)
(Continued)

(52) U.S. Cl.
CPC .............. *G06F 1/163* (2013.01); *G06F 3/005* (2013.01); *G06F 3/167* (2013.01); *G06V 40/168* (2022.01); *G06V 40/172* (2022.01)

(58) Field of Classification Search
USPC ........................................................ 345/156
See application file for complete search history.

(56) References Cited

U.S. PATENT DOCUMENTS 9,813,882 B1 11/2017 Masterman
2002/0087649 A1* 7/2002 Horvitz .................. H04L 51/00 709/207

(Continued)

FOREIGN PATENT DOCUMENTS

CN 109690686 A 4/2019
CN 110246569 A 9/2019

OTHER PUBLICATIONS

International Search Report and Written Opinion for PCT Application No. PCT/US2020/053449, mailed on Jun. 21, 2021, 11 pages.

(Continued)

*Primary Examiner* — Chineyere D Wills-Burns
(74) *Attorney, Agent, or Firm* — Brake Hughes Bellermann LLP

(57) ABSTRACT

According to an aspect, a method includes detecting, by at least one imaging sensor of a wearable device, facial features of an entity, detecting an interactive communication between a user of the wearable device and the entity based on at least image data from the at least one imaging sensor, updating a conversation graph in response to the interactive communication being detected between the user and the entity, and managing content for display on the wearable device based on the conversation graph.

22 Claims, 15 Drawing Sheets

Computing System 100
Processor(s) 103
Memory Device(s) 105
Imaging Sensors 104
Imaging Sensor 104a
Imaging Sensor 104b
Image Data 113
Applications 116
Email 118
Calendar 120
Browser 122
Storage 124
Voice Call 126
Messaging 128
Image Analyzer 106
Existing Contacts 130
Notifications 132
Interactive Communication Detector 108
Interactive Communication 109
Audio Data 134
Microphone 136
Conversation Graph Builder 110
Conversation Graph 138
Cluster Detector 112
Cluster Groups 160
Display Manager 140
Notification Manager 141
Voice Action Manager 142
Display 114
Content 111
Notifications 132
Messages 133
Suggested Entities 135
Message Delivery Manager 143
Autocomplete Manager 145
Voice Command 144

Conversation Graph 138
Event Metadata 152
Familiarity Metric 154
156
156-2
158
160-2
User 156-1
Entity A
156-6
160-1
156-3
Entity E
156-5
Entity B
156-4
Entity C
Entity D

(51) Int. Cl.

| | |
|---|---|
| ***G06F 18/2323*** | (2023.01) |
| ***G06V 10/44*** | (2022.01) |
| ***G06V 10/82*** | (2022.01) |
| ***G06V 40/16*** | (2022.01) |

(56) References Cited

U.S. PATENT DOCUMENTS

| | | | | |
|---|---|---|---|---|
| 2009/0132662 | A1* | 5/2009 | Sheridan | H04L 51/226 709/206 |
| 2013/0288722 | A1 | 10/2013 | Ramanujam et al. | |
| 2013/0335314 | A1 | 12/2013 | Chang et al. | |
| 2014/0108528 | A1* | 4/2014 | Papakipos | H04L 67/306 709/204 |
| 2016/0034042 | A1* | 2/2016 | Joo | G02B 27/0093 345/633 |
| 2017/0061213 | A1 | 3/2017 | Wexler et al. | |
| 2017/0337897 | A1* | 11/2017 | Jung | G06F 3/012 |
| 2018/0205792 | A1* | 7/2018 | Macksood | H04L 67/1097 |
| 2018/0219824 | A1* | 8/2018 | Laller | G06F 9/451 |
| 2018/0248942 | A1 | 8/2018 | Smarr et al. | |
| 2021/0281533 | A1* | 9/2021 | Schumacher | H04L 51/234 |

OTHER PUBLICATIONS

First Office Action (with English translation) for Chinese Application No. 202080105732.0, mailed Jul. 26, 2024, 18 pages.

* cited by examiner

MANAGING DISPLAY CONTENT ON A WEARABLE DEVICE USING A CONVERSATION GRAPH

CROSS-REFERENCE TO RELATED APPLICATION

This application is a 35 U.S.C. § 371 National Phase Entry Application from PCT/US2020/053449, filed on Sep. 30, 2020, entitled "MANAGING DISPLAY CONTENT ON A WEARABLE DEVICE USING A CONVERSATION GRAPH", the disclosure of which is incorporated herein by reference in its entirety.

FIELD

This disclosure relates to managing display content on a wearable device using a conversation graph.

BACKGROUND

Unless appropriate in quantity and type, notifications may feel interruptive on wearable devices such as smartglasses that visually display notifications overlaying the user's view of the world. The user's attention is a limited resource, so the device has a responsibility to ensure that the user is exposed to relevant and meaningful notifications. Similar to email, sending the user a notification is effectively free, so as the number of applications on a device increases, unwanted or less user notifications can increase as well.

SUMMARY

According to an aspect, a method includes detecting, by at least one imaging sensor of a wearable device, facial features of an entity, detecting an interactive communication between a user of wearable device and the entity based on at least image data from the at least one imaging sensor, updating a conversation graph in response to the interactive communication being detected between the user and the entity, and managing content for display on the wearable device based on the conversation graph.

According to some aspects, the method may include one or more (e.g., all) of the following features (or any combination thereof). The method may include receiving, via a microphone of the wearable device, a voice command from the user, identifying an entity associated with the voice command based on the conversation graph, and executing an action that uses the identified entity. In some examples, the method may include determining that the facial features correspond to an existing contact associated with the user of the wearable device. The method may include obtaining, by a first imaging sensor, first image data, determining whether the facial features are detected in the first image data, and obtaining, by a second imaging sensor, second image data in response to the facial features being determined as detected in the first image data, where the second image data has a resolution higher than the first image data. The second image data is used to determine whether the facial features correspond to the existing contact. The interactive communication is detected based on the image data and audio data received via a microphone of the wearable device. The conversation graph includes a plurality of nodes including a first node and a second node, the first node representing the user of the wearable device, the second node representing the entity, the conversation graph including a link connected between the first node and the second node. The method may include calculating a familiarity metric based on at least a frequency of detected interactive communications between the user and the entity and annotating the link or the second node with the familiarity metric. The method may include adjusting a familiarity metric in response to the interactive communication being detected between the user and the entity. The method may include creating a new node in the conversation graph in response to the interactive communication being detected between the user and the entity, the new node representing the entity, and creating a new link in the conversation graph between the new node and the first node, the new link or the new node being annotated with a familiarity metric representing a level of familiarity between the user and the entity. The method may include detecting a cluster group of entities among a plurality of entities based on information included within the conversation graph, identifying that the content is associated with an entity, and determining whether to display the content on the wearable device based on whether the entity associated with the content is included within the cluster group of entities. The method may include detecting a notification generated by an application executable by the wearable device, assigning a priority to the notification based on the conversation graph, and determining whether to display the notification on the wearable device based on the assigned priority. The method may include determining that the notification is related to an entity included within the conversation graph, where the assigning includes assigning a priority to the notification higher than a priority assigned to a notification that relates to an entity not included within the conversation graph. The method may include receiving information from the user via an application executable by the wearable device, identifying at least one entity from the conversation graph based on the information, and providing the at least one entity as a suggested entity for display on an interface of the application. The method may include determining a ranking of a plurality of entities from the conversation graph based on a familiarity metric associated with one or more of the plurality of entities, where one or more of the plurality of entities are displayed as suggested entities according to the ranking. The method may include detecting a message to be delivered to the wearable device, assigning a priority to the message based on the conversation graph, delaying a delivery of the message in response to the priority being below a threshold level, and delivering the message in response to the priority being above the threshold level. The wearable device may include smartglasses.

According to an aspect, a non-transitory computer-readable medium storing executable instructions that when executed by at least one processor are configured to cause the at least one processor to detect, by at least one imaging sensor of a wearable device, facial features of an entity, determine that the facial features correspond to an existing contact associated with a user of the wearable device, detect an interactive communication between the user and the entity based on image data from the at least one imaging sensor and audio data received via a microphone of the wearable device, update a conversation graph in response to the interactive communication being detected between the user and the entity, where the conversation graph includes a plurality of nodes representing entities and links connected between the plurality of nodes. The executable instructions to update the conversation graph include instructions to calculate a familiarity metric associated with the entity and annotate a node or link with the familiarity metric and manage content for display on the wearable device based on the conversation graph.

According to some aspects, the non-transitory computer-readable medium may include one or more (e.g., all) of the following features (or any combination thereof). The executable instructions include instructions that when executed by the at least one processor cause the at least one processor to obtain, by a first imaging sensor, first image data, determine whether the facial features are detected in the first image data, and obtain, by a second imaging sensor, second image data in response to the facial features being determined as detected in the first image data. The second image data has a resolution higher than the first image data. The second image data is used to determine whether the facial features correspond to the existing contact. The executable instructions include instructions that when executed by the least one processor cause the at least one processor to receive, via the microphone of the wearable device, a voice command from the user, identify an entity associated with the voice command based on the conversation graph, and execute an action that uses the identified entity.

According to an aspect, a wearable device comprising a first imaging sensor configured to receive first image data, a second imaging sensor configured to receive second image data, where the second image data has a resolution higher than a resolution of the first image data, and an image analyzer configured to detect a presence of facial features of an entity in the first image data and activate the second imaging sensor to obtain the second image data in response to the facial features in the first image data being detected. The image analyzer is configured to use the second image data to determine that the facial features correspond to an existing contact associated with a user of the wearable device. The wearable device includes an interactive communication detector configured to detect an interactive communication between the user and the entity based on at least one of the first image data or the second image data, a conversation graph builder configured to update a conversation graph in response to the interactive communication being detected between the user and the entity, and a display manager configured to manage content that is displayed on a display of the wearable device based on the conversation graph.

According to some aspects, the wearable device may include one or more (e.g., all) of the following features (or any combination thereof). The conversation graph includes a plurality of nodes representing entities and links connected between the plurality of nodes, where the conversation graph builder is configured to calculate a familiarity metric associated with the entity and annotate a node or link with the familiarity metric. The display manager includes a notification manager configured to manage a display of notifications based on the conversation graph, where the wearable device further includes a cluster detector configured to detect a cluster group of entities among a plurality of entities based on information included within the conversation graph. The notification manager is configured to identify that a notification is associated with an entity and assign a priority to the notification based on whether the entity associated with the notification is included within the cluster group of entities.

According to an aspect, a non-transitory computer-readable medium storing executable instructions that when executed by at least one processor are configured to cause the at least one processor to receive image data from at least one imaging sensor of a wearable device, the image data including facial features of an entity, determine that the facial features correspond to an existing contact associated with a user of the wearable device, detect an interactive communication between the user and the entity based on image data from the at least one imaging sensor and audio data received via a microphone of the wearable device, update a conversation graph in response to the interactive communication being detected between the user and the entity, where the conversation graph includes a plurality of nodes representing entities and links connected between the plurality of nodes. The executable instructions to update the conversation graph include instructions to calculate a familiarity metric associated with the entity and annotate a node or link with the familiarity metric. The executable instructions include instructions to manage content for display on the wearable device based on the conversation graph. In some examples, the executable instructions include instructions that when executed by the at least one processor cause the at least one processor to receive first image data from a first imaging sensor on the wearable device, determine whether the facial features are detected in the first image data, and receive second image data from a second imaging sensor in response to the facial features being determined as detected in the first image data, the second image data having a resolution higher than the first image data, where the second image data is used to determine whether the facial features correspond to the existing contact.

DETAILED DESCRIPTION

Figure 1A:
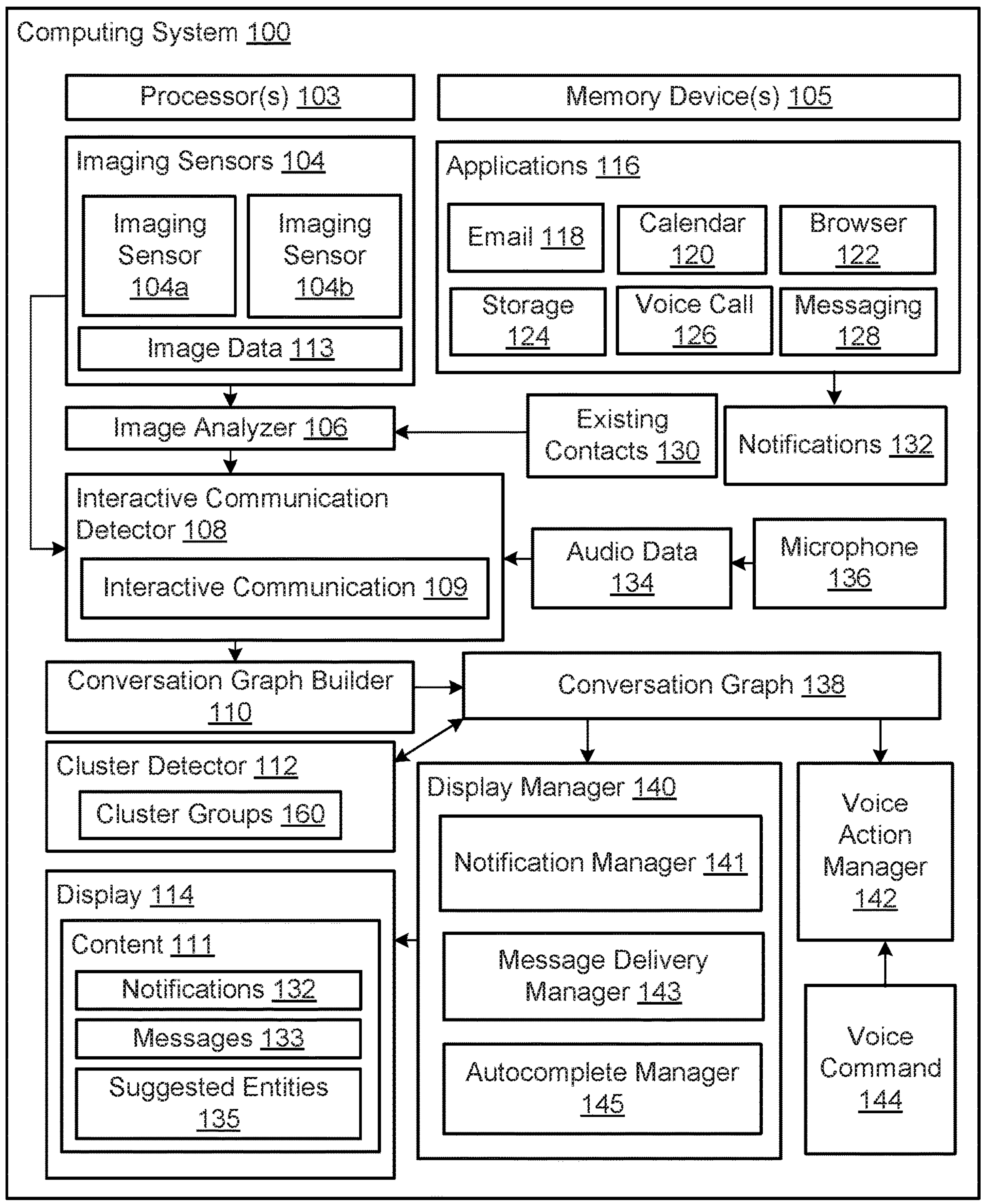
FIG. 1A illustrates a computing system for managing content using a conversation graph according to an aspect.

This disclosure relates to a computing system that manages content to be displayed using a conversation graph. The computing system may include a head-mounted display device such as smartglasses. The conversation graph is constructed based on detected real-life interactions between the user and other entities. For example, the conversation graph may include a plurality of nodes and a plurality of links that connect the plurality of nodes, where each node may represent an entity that had a conversation with the user in real life. For example, a first node may represent the user of the computing system and a second node may represent entity A. The first node is connected to the second node via a link, where the link (or the second node) is annotated with familiarity metric. The familiarity metric may represent a level of familiarity between the user and entity A (e.g., higher the familiarity metric, higher the level of familiarity between the user and entity A). The familiarity metric may be computed based on the frequency and/or temporal length of interactions between the user and entity A.

The computing system may include one or more imaging sensors. The imaging sensor(s) may capture image data, where at least a portion of a person is included in the image data (e.g., person A enters the field of view of the imaging sensor(s)). The computing system (e.g., wearable device) may analyze the image data to detect facial features of person A and determine whether the facial features correspond to an existing contact associated with the user. In some examples, the computing system can detect that the user should recognize the entity but does not determine the identity of the entity. For example, the computing system may not necessarily identify the entity, but uses the fact that an entity is present as a clue.

In some examples, the computing system may detect a face in the image data and compare the detected face with image data associated with their contacts to determine (e.g., by accessing a database storing existing contacts data) whether the newly captured face corresponds to one of the user's existing contacts. In some examples, the computing system includes a first imaging sensor (e.g., a low power camera) and a second imaging sensor (e.g., a high power camera). In some examples, the first imaging sensor is activated (e.g., continuously or periodically activated) to detect the presence of facial features within the image data. If facial features are detected, the second imaging sensor is activated to capture higher resolution image data, which is then used to determine whether the newly captured face corresponds to one of the user's existing contacts. When the computing system detects the facial features of an existing contact (e.g., Person A is one of the user's contacts), the computing system may determine whether the user and Person A is engaging in an interactive communication (e.g., a conversation), which may be based on the image data (and/or audio data captured from a microphone on the wearable device). In response to the detection of an interactive communication between the user and person A, the computing system may update the conversation graph. In some examples, this data (or a portion thereof) is stored locally.

The computing system may manage content (e.g., notifications, messages, etc.) that is displayed on the system's display using the conversation graph. This allows a sensor-based solution to reduce displayed content in an effective manner. In some examples, the content is a notification generated by an application executable by the computing system. In some examples, the content is information provided via an autocomplete interface of an application. In some examples, the content is a message (e.g., instant message) to be delivered to the system's display. In some examples, instead of (or addition to) the management of content that is displayed on a display, the computing system may use the conversation graph to identify an entity that is specified (or partly specified) in a voice command.

In further detail, the computing system may detect a notification from an application executable by the computing system and determine whether or not to display the notification on the display using the conversation graph. For example, if the notification is associated with an entity that is included in the conversation graph, the computing system may determine to display the notification on the display. If the notification is not associated with an entity that is included in the conversation graph, the computing system may determine to not display the notification at this time. In some examples, the computing system assigns a priority to the notification based on the conversation graph. For example, if the notification is associated with an entity that is included within the conversation graph, the notification may be assigned a higher priority than a notification associated with an entity that is not included within the conversation graph. Higher priority notifications may be displayed to the user before lower priority notifications. In some examples, the computing system uses the familiarity metrics to assign different priorities for entities within the conversation graph. For example, if the user regularly converses with entity B (but does not regularly converse with entity A), the computing system may assign a priority to a notification associated with entity B that is higher than a priority assigned to a notification associated with entity A. In this manner, the computing system may reduce the amount of unwanted or less useful notifications that are presented to the user.

In some examples, the computing system may detect one or more cluster groups based on the information included within the conversation graph. Each cluster group includes two or more nodes (or entities) which have data that correspond to a common characteristic. If entity A had a conversation with the user, the conversation graph may be updated to incorporate event metadata about the interaction. Over time, the computing system may use the event metadata and the connections between the various nodes in the conversation graph to detect one or more cluster groups of entities (e.g., work entities, family entities, social entities, etc.). Then, the computing system may use the cluster groups to determine which notifications to be displayed on the display (e.g., assigning priority to work notifications while the user is physically present with work contacts, assigning priority to social notifications while the user is physically present with social contacts, etc.).

In some examples, the conversation graph is used to create smarter autocomplete interfaces. The computing system may receive information from the user via an application executable by the computing system. For example, the user may be using an email application to create a new message, where the user starts to type a name in the address bar. The computing system may identify one or more entities from the conversation graph, and then display these entities as suggested entities on an autocomplete interface.

FIGS. 1A through 1G illustrates a computing system 100 for managing content 111 on a display 114 using a conversation graph 138 according to an aspect. For example, based on image data 113 received via one or more imaging sensors 104, the computing system 100 constructs a conversation graph 138 that identifies the entities in which the user of the computing system 100 interacts with in real life (and, in some examples, virtually). Using the conversation graph 138, the computing system 100 manages content 111 that is displayed on the display 114 such as prioritizing a notification 132 and/or a message 133 from an entity included within the conversation graph 138 and/or identifying one or more suggested entities 135 on an auto-complete interface of an application 116.

In some examples, the computing system 100 can identify an entity associated with a voice command based on the conversation graph 138 (e.g., the voice command of "ok device, call Tristan" could identify the intended entity when there are multiple existing contacts 130 of "Tristan"). In some examples, the conversation graph 138 can be analyzed to determine one or more cluster groups 160 (e.g., work entities, social entities, etc.), and the computing system 100 may use the cluster groups 160 to determine which notifications 132 to be prioritized for display on the display 114 (e.g., assigning priority to work notifications while the user is physically present with work contacts, assigning priority to social notifications while the user is physically present with social contacts, etc.).

The computing system 100 may include one or more devices, where at least one of the devices is a display device capable of being worn on the skin of a person. In some examples, the computing system 100 is or includes a wearable device. The wearable device may include a head-mounted display (HMD) device such as an optical head-mounted display (OHMD) device, a transparent heads-up display (HUD) device, an augmented reality (AR) device, or other devices such as googles or headsets having sensors, display, and computing capabilities. In some examples, the wearable device includes smartglasses. Smartglasses is an optical head-mounted display device designed in the shape of a pair of eyeglasses. For example, smartglasses are glasses that add information (e.g., project a display 114) alongside what the wearer views through the glasses. In some examples, the computing system 100 includes a wearable device (e.g., smartglasses) and a computing device (e.g., a mobile computing device such as a smartphone, or a server computer). The wearable device may be connected to the computing device via a wireless connection such as a short-range connection (e.g., Bluetooth connection or near-field communication (NFC) connection) or an Internet connection (e.g., Wi-Fi or mobile network). In some examples, some of the components of the computing system 100 are included in the wearable device and some of the components of the computing system 100 are included in the computing device. In some examples, all of the components of the computing system 100 are included in the wearable device.

The computing system 100 includes one or more processors 103, which may be formed in a substrate configured to execute one or more machine executable instructions or pieces of software, firmware, or a combination thereof. The processors 103 can be semiconductor-based—that is, the processors can include semiconductor material that can perform digital logic. The computing system 100 can also include one or more memory devices 105. The memory devices 105 may include any type of storage device that stores information in a format that can be read and/or executed by the processor(s) 103. The memory devices 105 may store applications 116 and modules (e.g., image analyzer 106, interactive communication detector 108, conversation graph builder 110, cluster detector 112, display manager 140, voice action manager 142, etc.) that, when executed by the processor(s) 103, perform certain operations. In some examples, the applications 116 and modules, may be stored in an external storage device and loaded into the memory devices 105.

The computing system 102 includes applications 116, which can be stored in the memory devices 105, and that, when executed by the processors 103, perform certain operations. The applications 116 may be any type of computer program that can be executed by the computing system 100. The applications 116 may enable the computing system 100 to perform certain functions such as browse the Internet, send an email or text message, capture an image, record a video, get directions, etc. The applications 116 may widely vary, but may include an email application 118, a calendar application 120, a browser application 122, a storage application 124, a voice call application 126, and/or a messaging application 128.

The computing system 100 includes a display 114 that is projected onto the field of view of the user. The display 114 may include a liquid crystal display (LCD), a light-emitting diode (LED) display, an organic light-emitting display (OLED), an electro-phoretic display (EPD), or a micro-projection display adopting an LED light source. In some examples, the case of smartglasses, the display 114 may provide a transparent or semi-transparent display such that the user wearing the glasses can see images provided by the display 114 but also information located in the field of view of the smartglasses behind the projected images. Although not shown in FIGS. 1A through 1G, the computing system 100 may include a touchpad that allows the user to control the computing system 100 (e.g., which can allow swiping through an interface displayed on the display 114). Although not shown in FIGS. 1A through 1G, the computing system 100 includes a battery configured to provide power to the circuit components, a battery charger to control the charging of the battery, and one or more antennas to enable communication with other computing device(s).

The computing system 100 includes a plurality of sensors such as a microphone 136 configured to capture audio data 134 and one or more imaging sensors 104 configured to capture image data 113. Although not shown in FIGS. 1A through 1H, the computing system 100 may include other types of sensors such as a light condition sensor (e.g., ambient light sensor) and a motion sensor configured to detect the motion of the computing system 100. The microphone 136 is a transducer device that converts sound into an electrical signal, which is represented by the audio data 134. The imaging sensor(s) 104 are cameras that detect and convey information used to make an image, which is represented by the image data 113. The imaging sensor(s) 104 can take pictures and record video. In some examples, the computing system 100 includes a single imaging sensor 104. In some examples, the computing system 100 includes multiple imaging sensors 104.

In some examples, computing system 100 includes an imaging sensor 104*a* and an imaging sensor 104*b*. In some examples, the computing system 100 includes more than two imaging sensors 104. The imaging sensor 104*a* may be considered a low power, low resolution (LPLR) image sensor. The imaging sensor 104*b* may be considered a high power, high resolution (HPLR) image sensor. An image captured by imaging sensor 104*b* has a higher resolution than an image captured by imaging sensor 104*a*. In some examples, the imaging sensor 104*a* is configured to obtain image data 113 while the computing system 100 is activated and the computing system 100 is coupled to the user (e.g., continuously or periodically captures image data 113 while the computing system 100 is activated). In some examples, the imaging sensor 104*a* is configured to operate as an always-on sensor. In some examples, the imaging sensor 104*b* is activated (e.g., for a short duration) in response to the detection of an object of interest, as further discussed below.

While the user is wearing the computing system 100 (or a portion of the computing system 100), an imaging sensor 104 captures image data 113. The computing system 100 includes an image analyzer 106 that receives the image data 113 captured by the imaging sensor 104. In some examples, the imaging sensor 104*a* (e.g., LPLR image sensor) is activated while the user is wearing the computing system 100, and the image analyzer 106 receives the image data 113 from the imaging sensor 104*a*. The image analyzer 106 analyzes the image data 113 to determine whether or not the image data 113 includes an object of interest (e.g., facial features (or face) of an entity).

The image analyzer 106 may include a machine-learning (ML) model (e.g., one or more classifiers) configured to execute an object recognition algorithm (e.g., a facial recognition algorithm). In some examples, the ML model includes a neural network. The neural network may be an interconnected group of nodes, each node representing an artificial neuron. The nodes are connected to each other in layers, with the output of one layer becoming the input of a next layer. Neural networks transform an input (e.g., the image data 113), received by the input layer, transform it through a series of hidden layers, and produce an output via the output layer. Each layer is made up of a subset of the set of nodes. The nodes in hidden layers are fully connected to all nodes in the previous layer and provide their output to all nodes in the next layer. The nodes in a single layer function independently of each other (i.e., do not share connections). Nodes in the output provide the transformed input to the requesting process. In some examples, the neural network is a convolutional neural network, which is a neural network that is not fully connected. Convolutional neural networks therefore have less complexity than fully connected neural networks. Convolutional neural networks can also make use of pooling or max-pooling to reduce the dimensionality (and hence complexity) of the data that flows through the neural network and thus this can reduce the level of computation required. This makes computation of the output in a convolutional neural network faster than in neural networks.

The image analyzer 106 may receive the image data 113 and predict, using the ML model, whether or not the image data 113 includes facial features of an entity. If the image analyzer 106 does not detect facial features of an entity within the image data 113, the image analyzer 106 may continuously (e.g., periodically) receive image data 113 from the imaging sensor 104 (e.g., the imaging sensor 104*a*) to continue to determine whether that image data 113 includes facial features of an entity that entered the field of view of the imaging sensor 104. In some examples, since the imaging sensor 104*a* (e.g., the LPLR camera) is used to search for facial features, the power of the computing system 100 may be reduced, which can extend the life of the battery of the computing system 100.

If the image analyzer 106 detects the existence of facial features within the image data 113, the image analyzer 106 determines whether the facial features relate to an existing contact 130 of the user. The existing contacts 130 may be obtained from one or more of the applications 116. In some examples, the existing contacts 130 may be obtained, over a network (e.g., internet), from a contact service executable by a server computer. In some examples, one of the applications 116 is a contact management application, and the existing contacts 130 may be accessed from the contact management application. In some examples, the existing contacts 130 are determined from the email application 118, the messaging application 128, the browser application 122, and/or generally any application 116 that is used to communicate virtually with other entities. In some examples, the existing contacts 130 are determined from multiple applications 116 (e.g., the stored contacts from the user's email, text, and/or calendar). The existing contacts 130 may include information about each entity such as the entity's name, address, phone number, and/or email address, etc. The existing contacts 130 may be associated with image data (e.g., person A's contact information may be stored along with a picture of person A, person B's information may be stored along with a picture of person B). The image analyzer 106 may compare the facial features of the image data 113 with image data of the existing contacts 130 to determine whether the entity's face captured by the imaging sensor 104 relates to one of the existing contacts 130.

The resolution of the image data 113 captured by the imaging sensor 104*a* (e.g., the LPLR camera) may be too low to perform a comparison with the image data associated with the existing contacts 130. In some examples, if the image analyzer 106 detects the existence of facial features within the image data 113 captured by the imaging sensor 104*a*, the image analyzer 106 may activate the imaging sensor 104*b* (e.g., HPHR camera) to capture a higher resolution image of the entity's facial features, and the higher resolution image data is used to compare the facial features with image data of the existing contacts 130 to determine whether the entity's face captured by the imaging sensor 104*b* relates to one of the existing contacts 130.

If the entity's face captured by the imaging sensor 104 relates to one of the existing contacts 130, an interactive communication detector 108 may detect whether an interactive communication 109 is occurring between the user and the entity based on at least the image data 113. In some examples, the interactive communication 109 is a real-life communication between the user and the entity (e.g., one-way communication or two-way communication). In some examples, the interactive communication 109 may be referred to as a conversation between two or more entities. Using the image data 113, the interactive communication detector 108 may estimate a location in which the entity is located with respect to the user of the computing system 100 and/or a gaze direction of the entity. Based on the estimated location and/or the gaze direction, the interactive communication detector 108 may determine whether the user and the entity are having an interactive communication 109 (e.g., the entity may be positioned in front of the user, and the gaze direction may indicate that the entity is looking at the user). In addition to the image data 113, in some examples, the interactive communication detector 108 uses audio data 134 received via the microphone 136 on the computing system 100 to detect whether an interactive communication 109 is occurring between the user and the entity. For example, the interactive communication detector 108 may determine that the audio data 134 includes speech, and, the detection of speech in conjunction with the information derived from the image data 113 may indicate that an interactive communication 109 is occurring between the entity and the user. In some examples, the interactive communication detector 108 detects a volume (or loudness) of the speech, and, if the volume of the speech is above a threshold level in conjunction with the information derived from the image data 113, the interactive communication detector 108 may detect an interactive communication 109 between the user and the entity.

In response to the interactive communication 109 being detected between the user and the entity, a conversation graph builder 110 may update a conversation graph 138 associated with the user. In some examples, the conversation graph builder 110 updates the conversation graph 138 in response to the interactive communication 109 being detected as started. In some examples, the conversation graph builder 110 updates the conversation graph 138 in response to the interactive communication being detected as ended (e.g., which may be from the point that the entity has moved outside the field of view of the imaging sensor 104 and/or the audio data 134 being determined as not including speech). In some examples, even if the entity's face captured by the imaging sensor 104 does not relate to one of the existing contacts 130 but the interactive communication detector 108 detects an interactive communication 109 between the entity and an unknown contact, the conversation graph builder 110 may update the conversation graph 138 to incorporate the unknown contact.

The conversation graph 138 is constructed based on detected real-life interactions between the user and other entities. For example, referring to FIG. 1B, the conversation graph 138 may include a plurality of nodes 156 and a plurality of links 158 that connect the plurality of nodes 156, where each node 156 may represent an entity that had a conversation with the user in real life. In some examples, the conversation graph 138 includes nodes 156 representing entities in which the user has communicated virtually, e.g., via email, text messaging, instant messaging, etc.

Figure 1B:
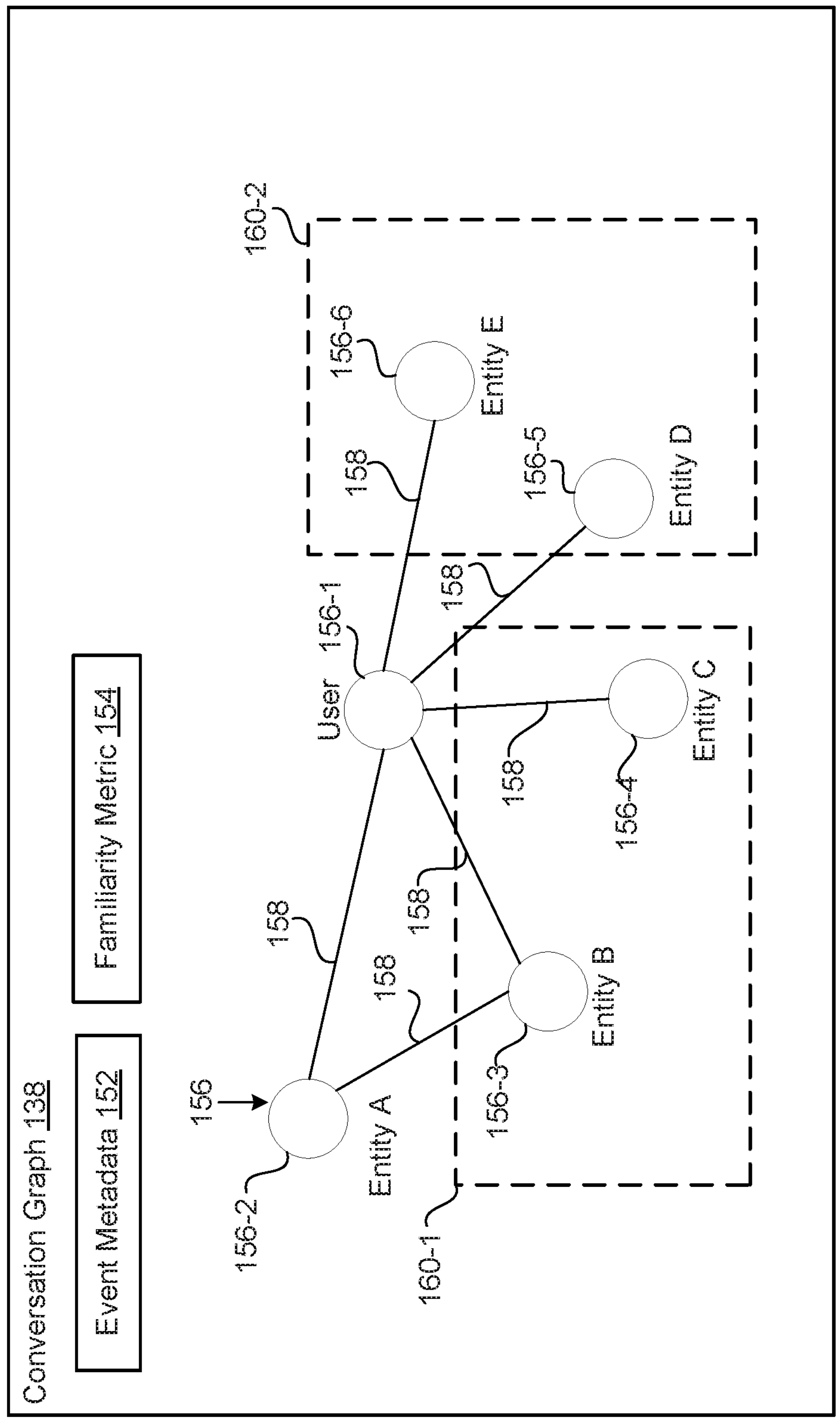
FIG. 1B illustrates a conversation graph according to an aspect.

In some examples, as shown in FIG. 1B, the plurality of nodes 156 may include a first node 156-1 that represents the user of the computing system 100, a second node 156-2 that represent entity A, a third node 156-3 that represents entity B, a fourth node 156-4 that represents entity C, a fifth node 156-5 that represents entity D, and a sixth node 156-6 that represents entity E. Entity A through Entity E may represent different people in which the computing system 100 has detected an interactive communication 109 with the user of the computing system 100. Each of the second node 156-2 through the sixth node 156-6 is connected with the first node 156-1 via a separate link 158. The conversation graph 138 includes a familiarity metric 154 associated with each entity included within the conversation graph 138. In some examples, each link 158 is annotated with a corresponding familiarity metric 154. The familiarity metric 154 may represent a level of familiarity between the user and an entity (e.g., higher the familiarity metric 154, higher the level of familiarity between the user and entity). The conversation graph builder 110 may compute the familiarity metric 154 based on the frequency and/or temporal length of interactions between the user and a respective entity. For example, if Entity A has a number of detected interactive communications 109 with the user of the computing system 100 (and/or one or some of the detected interactive communications 109 are relatively (e.g., in comparison with detected interactive communications with other entities) long), the familiarity metric 154 associated with Entity A (or the link 158 connected between the first node 156-1 and the second node 156-2) may be relatively (e.g., in comparison with that of other entities) high.

In some examples, in response to the detection of an interactive communication 109 between the user and Entity A, the conversation graph builder 110 may determine whether a node 156 representing Entity A is already included within the conversation graph 138. If Entity A is not included within the conversation graph 138, the conversation graph builder 110 may add a new node 156 (e.g., second node 156-2) to the conversation graph 138 with a new link 158 connected to the first node 156-1 that represents the user of the computing system 100. If Entity A is determined as an existing contact 130, the second node 156-2 may be annotated with information about Entity A such as the name and other contact details. If Entity A is not determined as an existing contact 130, the second node 156-2 may be annotated with information that indicates that Entity A is unknown.

In some examples, the conversation graph builder 110 may update the conversation graph 138 to include event metadata 152 about the conversation event. The conversation event may be created in response to the detection of an interactive communication 109. The event metadata 152 may include the length of time of the interactive communication 109, the detected starting and ending points of the interactive communication 109, and/or the location of where the interactive communication 109 occurs. The event metadata 152 may also store the frequency of interactive communications 109 between the user and a respective entity over a period of time.

With respect to entity A, the conversation graph builder 110 may compute a familiarity metric 154 about the strength of the connection between the user and Entity A based on the event metadata 152 and annotate the link 158 between the first node 156-1 and the second node 156-2 with the familiarity metric 154 associated with entity A. For example, if the interactive communication 109 between entity A and the user was relatively (e.g., in comparison with detected interactive communications with other entities) short and it is the first detected interactive communication 109 between entity A and the user, the familiarity metric 154 may be relatively (e.g., in comparison with that of other entities) low. In response to the detection of an interactive communication 109 between the user and entity A and the determination that entity A is already included within the conversation graph 138, the conversation graph builder 110 may adjust (e.g., increase) the familiarity metric 154, as well as update the event metadata 152 to include the new conversation event details.

In some examples, over time, one or more cluster groups 160 may be detected. For example, a cluster detector 112 may analyze the conversation graph 138 to detect one or more cluster groups 160 based on the information included within the conversation graph 138 (e.g., the node 156, the links 158, the event metadata 152, the familiarity metrics 154, etc.), where each cluster group 160 includes two or more nodes 156 which have data that correspond to a common characteristic (e.g., work, home, social, etc.). As the conversation graph 138 is constructed over time (e.g., entity A through entity E are incorporated into the conversation graph 138) the cluster detector 112 may use the event metadata 152 and the connections between the various nodes 156 in the conversation graph 138 to detect one or more cluster groups 160 of entities (e.g., work entities, family entities, social entities, etc.). Then, as more interactive communications 109 are detected, based on the characteristics of the new entity, the cluster detector 112 may assign that new entity to a cluster group 160. In some examples, other signals include the type of environment the communication happens in.

In some examples, the cluster detector 112 is configured to execute a clustering algorithm to detect one or more cluster groups 160 of entities. In some examples, the cluster detector 112 may use a k-means or other unsupervised clustering algorithm to detect the cluster groups 160. In some examples, the clustering algorithm includes a community-based clustering algorithm. In some examples, the clustering algorithm includes a sim clustering algorithm. In some examples, the clustering algorithm includes a modularity-based graph partitioning algorithm. In some examples, the clustering algorithm includes a Louvain clustering algorithm. In some examples, the clustering algorithm includes a machine-learning-based algorithm defining a neutral network. In some examples, the clustering algorithm includes any type of connectivity-based clustering algorithm (e.g., hierarchical clustering algorithm), centroid-based clustering algorithm, distribution-based clustering algorithm, and/or density-based clustering algorithm.

For example, the cluster detector 112 may determine that entity B and entity C are work contacts and create a first cluster group 160-1 with entities B and C. The cluster detector 112 may determine that entity E and entity D are social contacts and create a second cluster group 160-2 with entities E and D. As further discussed below, a display manager 140 may use the cluster groups 160 to determine which notifications 132 to be displayed on the display 114 (e.g., assigning priority to work notifications while the user is physically present with work contacts, assigning priority to social notifications while the user is physically present with social contacts, etc.).

Referring to FIG. 1A, the display manager 140 may manage content 111 that is displayed on the display 114 of the computing system 100 using the conversation graph 138. The content 111 may be generated by an application 116 or an operating system associated with the computing system 100. In some examples, the content 111 may be any type of data that can be displayed on the display 114 that may originate from or is associated with an entity. In some examples, the display manager 140 may permit the display of content 111 if the content 111 is associated with an entity (e.g., entity A through entity E) that is included within the conversation graph 138. For example, if the content 111 is generated by or is associated with entity A, and entity A is included within the conversation graph 138, the display manager 140 may permit the display of that content 111 or assign a higher priority to the display of that content 111. In some examples, the display manager 140 may permit the display of content 111 or assign a higher priority to the display of that content 111 if that entity has a familiarity metric 154 over a threshold amount.

In some examples, the display manager 140 may delay the display of content 111 or assign a lower priority to the display of that content 111 if the content 111 is associated with an entity that is not included within the conversation graph 138. In some examples, the content 111 may be delayed until the computing system 100 is activated from a power saving state or at some other later point after the point for which the content 111 is originally set to be displayed. If the content 111 is associated with Entity F (e.g., Entity F is not included within the conversation graph 138), the display manager 140 may delay the display of content 111 or assign a lower priority to the display of that content 111. In some examples, the display manager 140 may delay the display of content 111 or assign a lower priority to the display of that content 111 if the content 111 is associated with an entity that is included within the conversation graph 138, but that entity's familiarity metric 154 is below a threshold amount.

In some examples, the content 111 includes notifications 132 that are generated by the applications 116. For example, an online streaming application may generate a notification 132 about a new show (where the online streaming application is considered an entity), or an email application 118 may generate a notification 132 about a new email received from a certain entity. In some examples, the content 111 includes messages 133. The messages 133 may be text messages or other types of instant messaging. In some examples, the content 111 includes one or more suggested entities 135 from the conversation graph 138 for display on an autocomplete interface of an application 116.

The display manager 140 may include a notification manager 141 configured to manage the notifications 132 based on the conversation graph 138. In some examples, the display manager 140 includes a message delivery manager 143 configured to manage the delivery of messages 133 based on the conversation graph 138. In some examples, the display manager 140 may include an autocomplete manager 145 configured to identify, using the conversation graph 138, one or more suggested entities 135 for display on an autocomplete interface of an application 116.

Figure 1C:
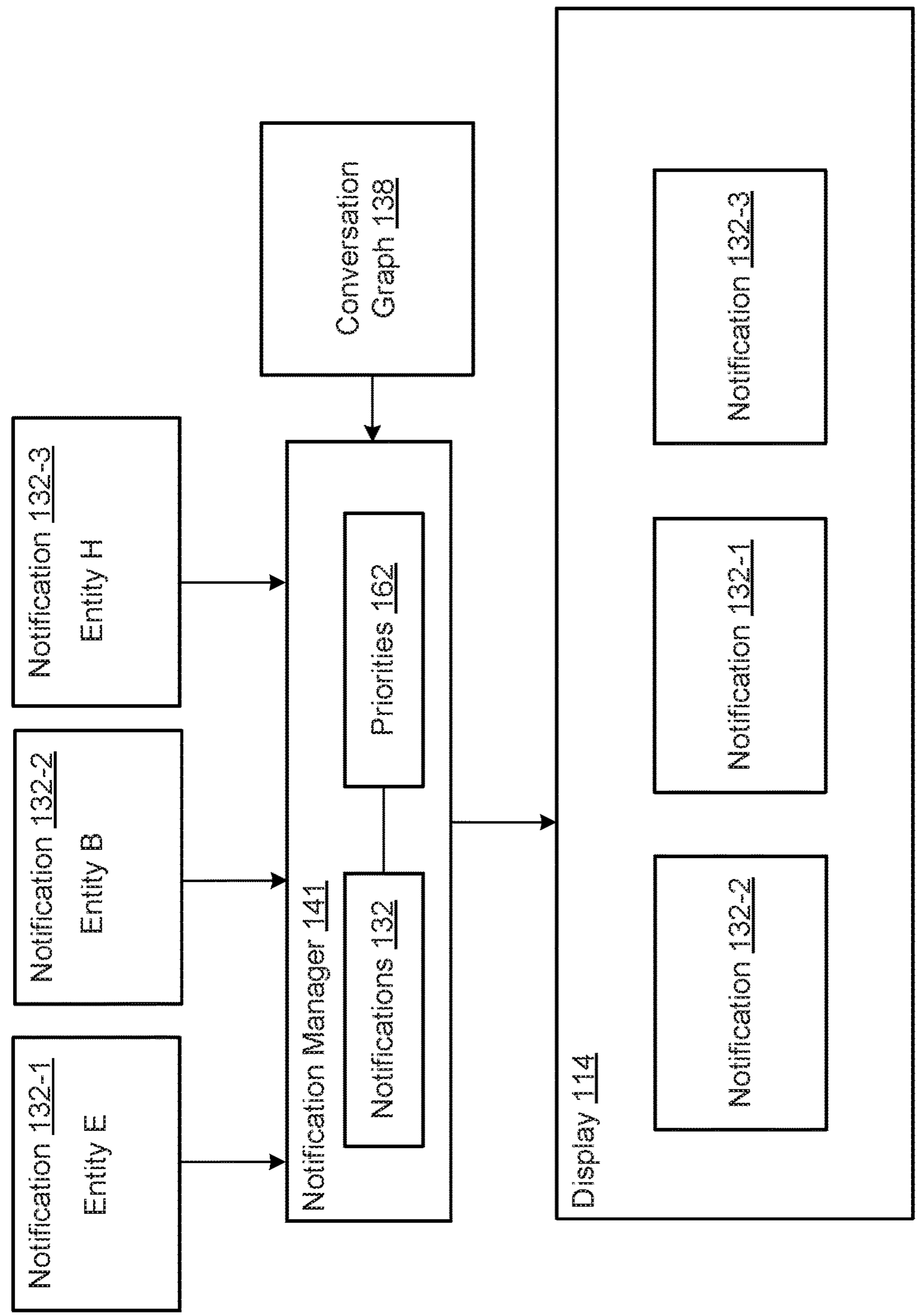
FIG. 1C illustrates an example of a notification manager for managing notifications using the conversation graph according to an aspect.

As shown in FIG. 1C, the notification manager 141 may detect notifications 132 to be delivered to the display 114 and assign priorities 162 to the notifications 132 based on the conversation graph 138. The priorities 162 assigned to the notifications 132 may indicate the timing (and/or manner) in which the notifications 132 are notified to the user of the computing system 100. The priorities 162 may include a plurality of priority levels such as a first priority level, a second priority level, and a third priority level. The first priority level may be the highest priority level (e.g., the most disruptive to the user) and the third priority level may be the lowest priority level (e.g., the least disruptive to the user). In some examples, the priorities 162 include more than three priority levels.

The priorities 162 may include a wide variety of notification priority levels such as immediately displaying the notification 132 and redisplaying the notification 132 if the notification 132 is not checked after a certain period of time, immediately displaying the notification 132 without redisplaying the notification 132 after a period of time, immediately displaying the notification 132 with an auditory and/or vibration alert, not displaying the notification 132 but providing an auditory and/or vibration alert, delaying the display of the notification 132 until another notification 132 from the same entity is detected (and then displaying the notifications 132 as a group), displaying the display of the notification 132 until a number of similar notifications 132 are detected (and then displaying the similar notifications 132 as a group), not displaying the notification 132 and not providing an auditory and/or vibration alert, etc. Also, if the notification 132 is to be displayed, the priorities 162 may provide different priority levels on the size and/or location of the notification (e.g., a higher priority may indicate a larger size or displayed in a location of the display 114 that is more visible to the user).

The notification manager 141 may determine whether to display the notifications 132 on the display 114 based on the assigned priorities 162. In some examples, the notification manager 141 may assign a higher priority 162 to a notification 132 if the notification is associated with an entity included within the conversation graph 138. In some examples, notifications 132 from an email application 118 may have a default priority notification level (or a priority notification level that is set by the user for all notifications 132 generated by the email application 118). In some examples, if the notification 132 is associated with an entity that is included within the conversation graph 138, the notification manager 141 may assign a priority 162 to the notification 132 that is higher than the default or set priority notification level.

As shown in FIG. 1C, the notification manager 141 may detect a first notification 132-1 (where the first notification 132-1 is associated with entity E), a second notification 132-2 (where the second notification 132-2 is associated with entity B), and a third notification 132-3 (where the third notification 132-3 is associated with entity H). The notification manager 141 may detect the first notification 132-1, the second notification 132-2, and the third notification 132-3 are different times or around the same time. Referring to FIG. 1B, a node (e.g., sixth node 156-6) representing entity E is included in the conversation graph 138, and a node (e.g., third node 156-3) representing entity B is included in the conversation graph 138. However, a node representing entity H is not included in the conversation graph 138.

Referring back to FIG. 1C, the notification manager 141 may assign a higher priority 162 to the first notification 132-1 and the second notification 132-2 than the third notification 132-3 since entity E and entity B are included in the conversation graph 138. In some examples, the notification manager 141 may use the familiarity metrics 154 to assign priorities 162. For example, if entity B has a familiarity metric 154 that is higher than entity E, the notification manager 141 may assign a higher priority 162 to the second notification 132-2 as compared to the first notification 132-1.

Figure 1D:
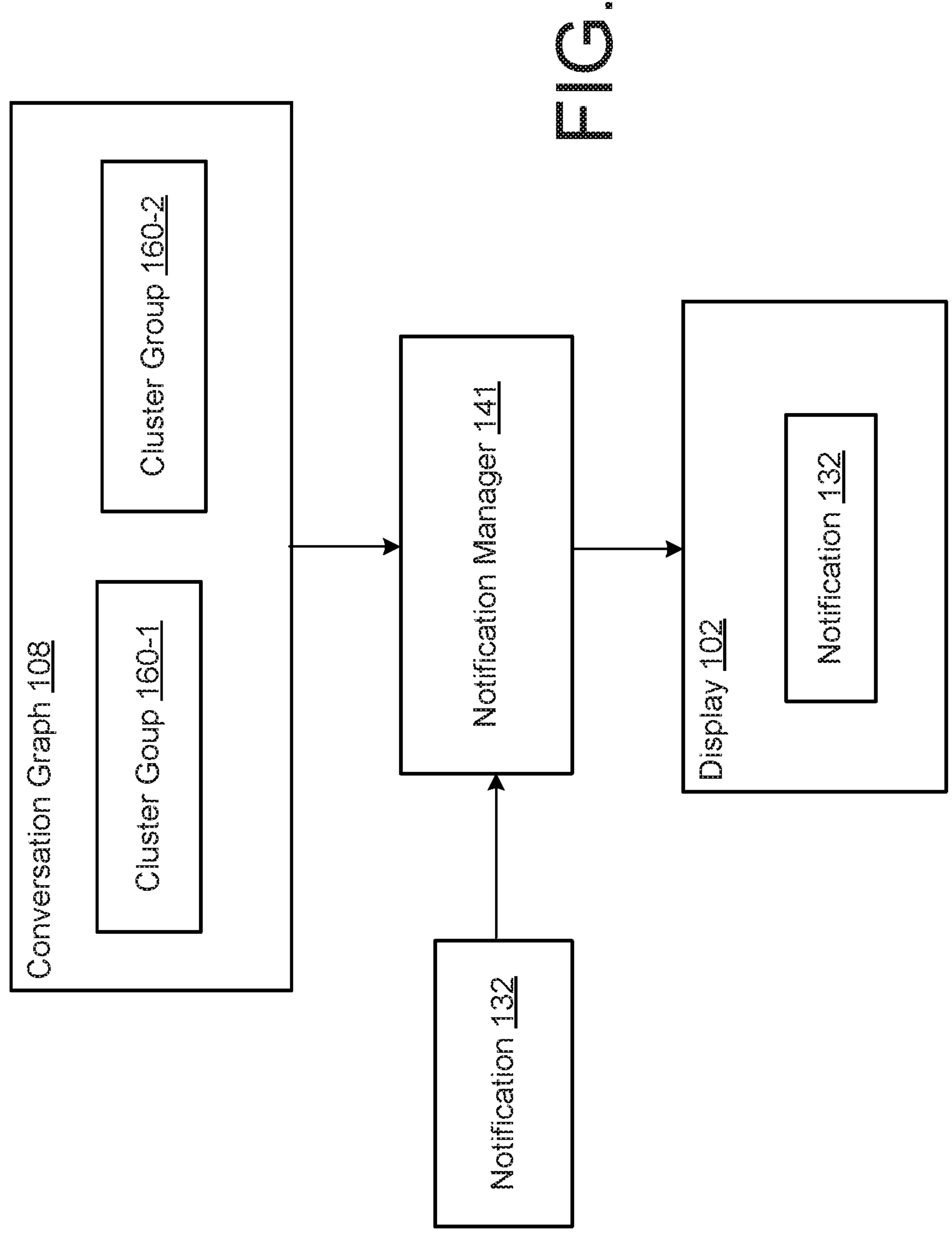
FIG. 1D illustrates an example of a notification manager for managing notifications using cluster groups of a conversation graph according to an aspect.

In some examples, referring to FIG. 1D, the notification manager 141 uses the detected cluster groups 160 to manage the display of the notifications 132. For example, over time, the cluster detector 112 may detect cluster groups 160 such as a first cluster group 160-1 and a second cluster group 160-2. The first cluster group 160-1 may relate to contacts of a first type, and the second cluster group 160-2 may relate to contacts of a second type. The contacts of a first type may include work contacts. The contacts of a second type may include social contacts. However, it is noted that work contacts and social contacts are merely examples, where the first cluster group 160-1 and the second cluster group 160-2 may relate to other types of groups. As shown in FIG. 1B, the first cluster group 160-1 may include entity B and entity C, and the second cluster group 160-2 may include entity D and entity E.

In some examples, the notification manager 141 may determine whether to display the notification 132 based on whether the entity associated with the notification 132 is included within a cluster group 160. For example, the notification manager 141 may receive an indication that the user is in the presence of work contacts. For example, the notification manager 141 may operate in conjunction with the image analyzer 106, and the image analyzer 106 may determine, using the image data 113, that the user is in the presence of one or more work contacts. In some examples, the notification manager 141 may use time and/or location information to determine whether the user is at work (and/or at another, e.g. predetermined, location). If the user is at work (and/or in the presence of work contacts) and the detected notification 132 relates to entity B, the notification manager 141 may assign a higher priority 162 to the notification 132 since entity B is within the first cluster group 160-1 relating to work contacts. On the other hand, if the detected notification 132 relates to entity E, the notification manager 141 may assign a lower priority 162 to the notification 132 since entity E is not a work contact.

Figure 1E:
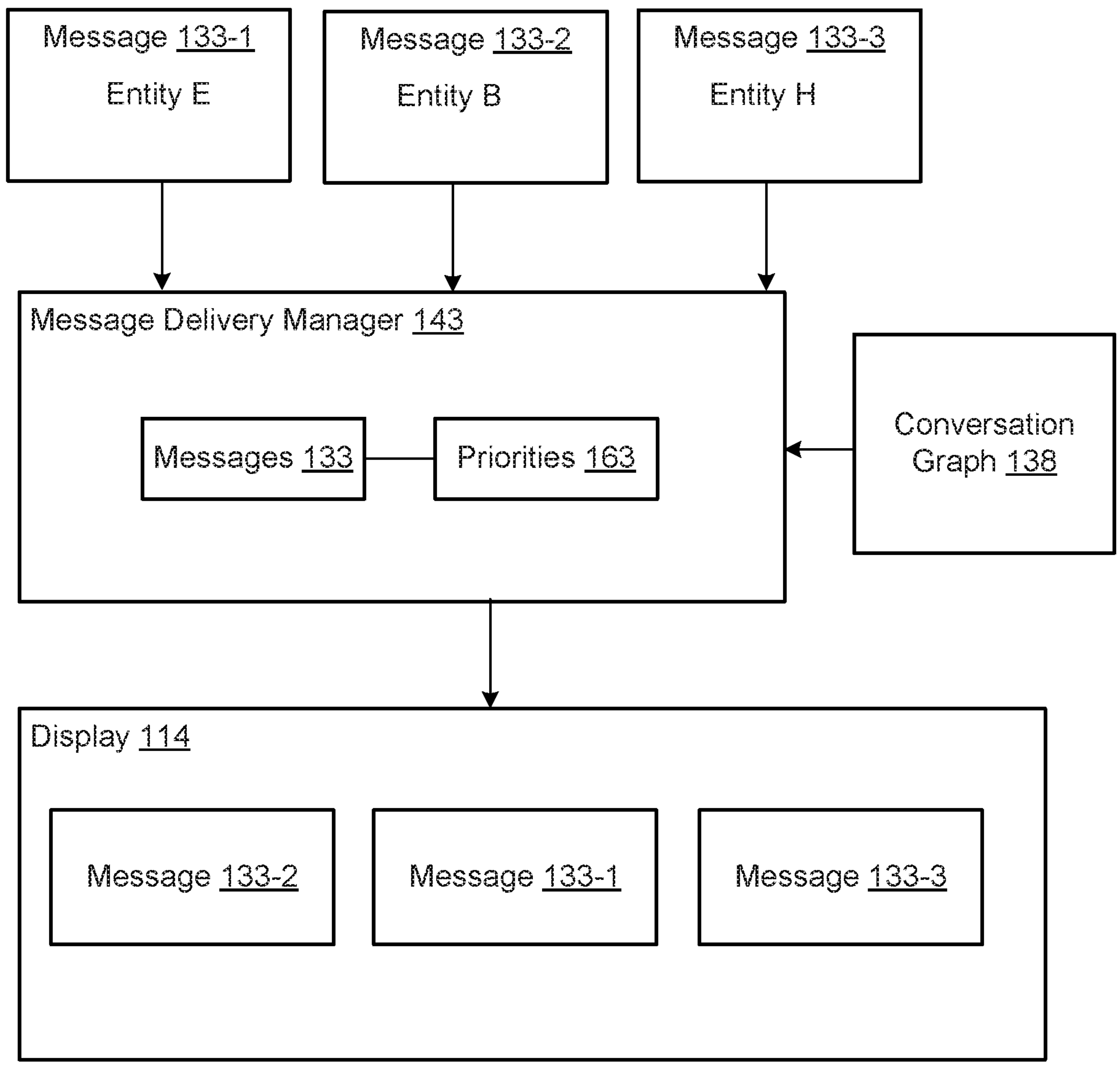
FIG. 1E illustrates an example of a message delivery manager for managing the delivery of messages using the conversation graph according to an aspect.
Figure 1F:
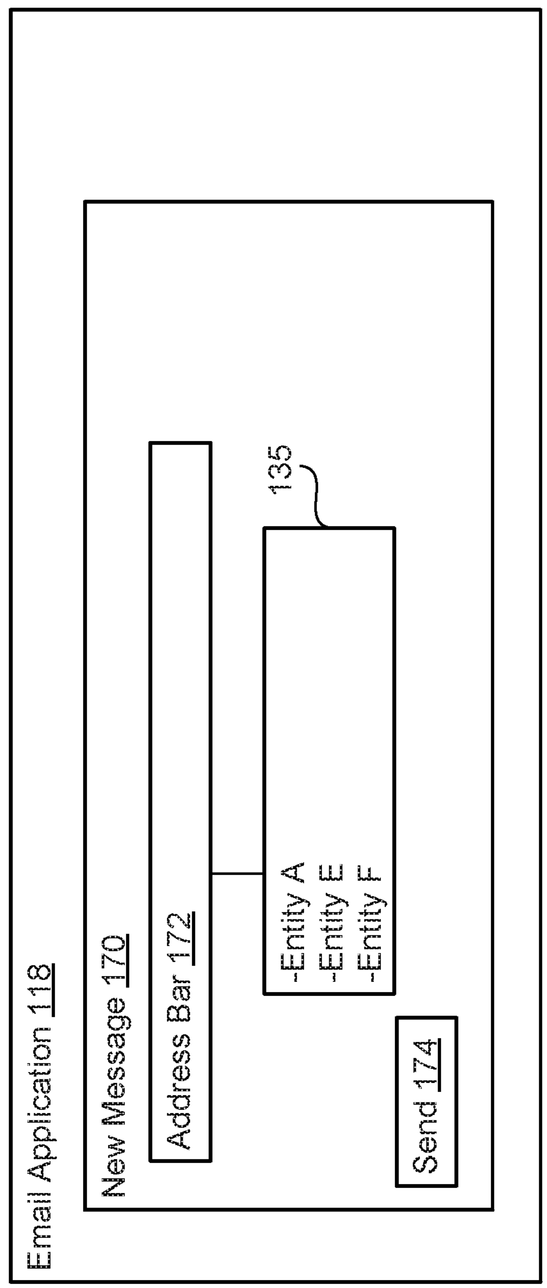
FIG. 1F illustrates an example of an application displaying suggested entities from the conversation graph according to an aspect.

As shown in FIG. 1E, the message delivery manager 143 may detect messages 133 to be delivered to the display 114 and assign priorities 163 to the messages 133 based on the conversation graph 138. The messages 133 may relate to messages delivered via the messaging application 128. In some examples, a message 133 can be from one of multiple different messaging applications 128. The priorities 163 assigned to the messages 133 may indicate the timing (and/or manner) in which the messages 133 are delivered to the user of the computing system 100. The priorities 163 may include a plurality of priority levels such as a first priority level, a second priority level, and a third priority level. The first priority level may be the highest priority level (e.g., the most disruptive to the user) and the third priority level may be the lowest priority level (e.g., the least disruptive to the user). In some examples, the priorities 163 include more than three priority levels. The priorities 163 may include a wide variety of notification priority levels such as immediately displaying the message 133, delaying the message 133 until a later time, and/or blocking the message 133. In some examples, the priorities 163 include any of the priorities discussed with reference to the priorities 162.

The message delivery manager 143 may determine whether to display the messages 133 on the display 114 based on the assigned priorities 163. In some examples, a message 133 is displayed on the display 114 in response to the priority 163 being greater than a threshold level. In some examples, the message delivery manager 143 may assign a higher priority 162 to a message 133 if the message 133 is associated with an entity included within the conversation graph 138. For example, the message delivery manager 143 may detect a first message 133-1 (where the first message 132-1 is associated with entity E), a second message 133-2 (where the second message 133-2 is associated with entity B), and a third message 133-3 (where the third message 133-3 is associated with entity H). Since entity E and entity B are included in the conversation graph 138 and Entity H is not included within the conversation graph 138, the message delivery manager 143 may assign a higher priority 163 to the first message 133-1 and the second message 133-2 than the third message 133-3, where the higher priority messages 133 are displayed first. In some examples, the message delivery manager 143 may use the familiarity metrics 154 to assign priorities 163. For example, if entity B has a familiarity metric 154 that is higher than entity E, the message delivery manager 143 may assign a higher priority 162 to the second message 133-2 as compared to the first message 133-1.

In some examples, the conversation graph 138 is used to create smarter autocomplete interfaces. For example, the autocomplete manager 145 may use the conversation graph 138 to identify one or more suggested entities 135 to be displayed on an autocomplete interface of an application 116. In some examples, the computing system 100 may receive information from the user via an application 116. For example, referring to FIG. 1F, the user may be using an email application 118 to create a new message 170, where the user starts to type a name in an address bar 172. The autocomplete manager 145 may identify one or more entities (e.g., entity A, entity E, and entity F) from the conversation graph 138, and then display these entities as suggested entities 135 on an autocomplete interface. For example, if the user types "K" in the address bar 172, the autocomplete manager 145 may identify the nodes 156 (e.g., Kellen, Katie, Kevin) in the conversation graph 138 that begin with the letter "K", and then display these entities as suggested entities 135 on the autocomplete interface of the application 116. After selecting the intended entity, the user may select send 174 to send the email. Although FIG. 1F uses the email application 118 as an example, the autocomplete manager 145 may operate in conjunction with any type of an application 116 such as the calendar application 120, the storage application 124, and/or the browser application 122.

Figure 1G:
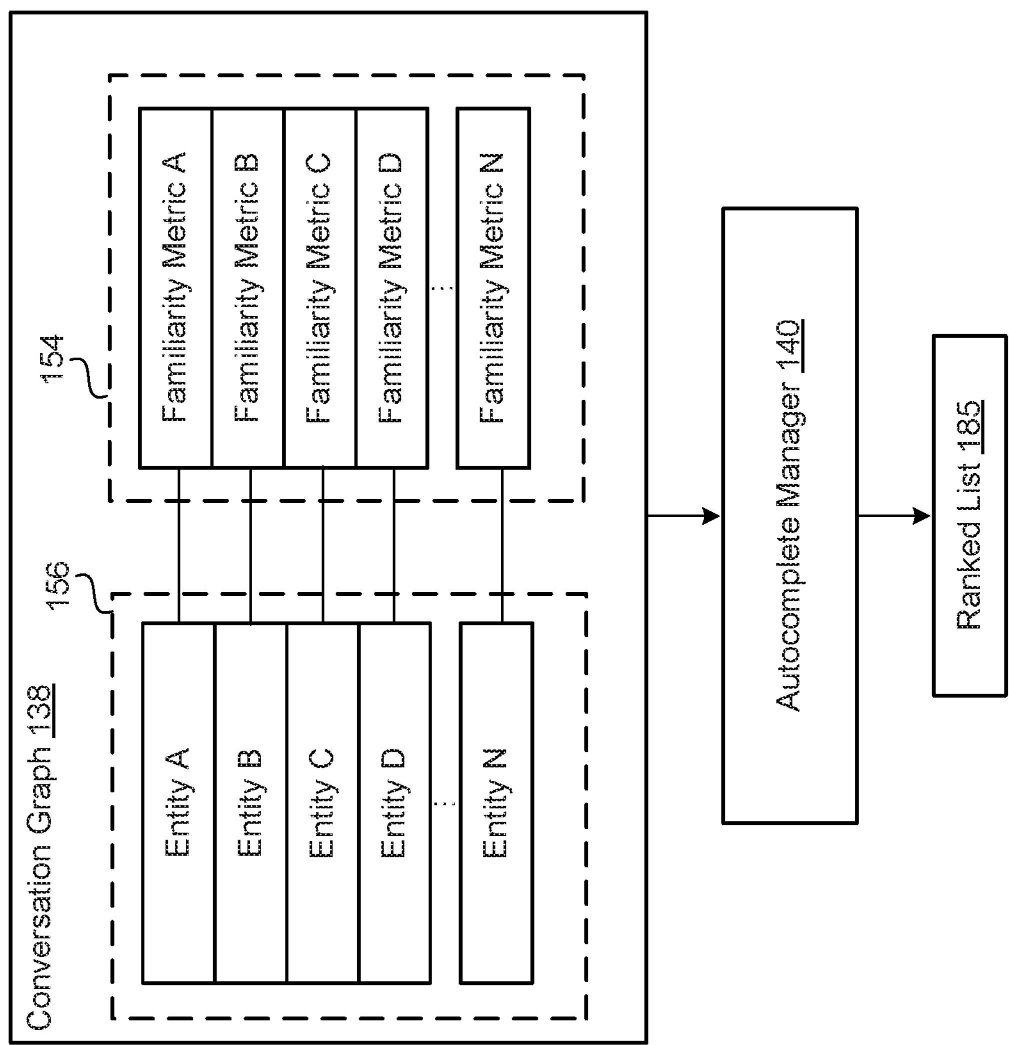
FIG. 1G illustrates an example of an autocomplete manager for ranking entities in the conversation graph according to an aspect.

In some examples, as shown in FIG. 1G, the autocomplete manager 145 may rank the nodes 156 (entities) in the conversation graph 138 based on each node's familiarity metric 154, and then provide the relevant entities as a ranked list 185 on the autocomplete interface of an application 116. For example, entity A may be associated with a familiarity metric A, entity B may be associated with a familiarity metric B, entity C may be associated with a familiarity metric C, entity D through entity N may be associated with a familiarity metric D through N, respectively. For example, if Kellen (entity A) has the highest familiarity metric 154 and Kevin (entity N) has the lowest familiarity metric 154, the autocomplete manager 145 may provide the list of suggested entities 135 as Kellen, Katie, and Kevin. In some examples, instead of ranking according to familiarity metrics 154, the autocomplete manager 145 may use the event metadata 152 to rank the suggested entities 135. For example, if the event metadata 152 indicates that the user had a recent interactive communication 109 with Kevin, the autocomplete manager 145 may identify Kevin as a suggested entity 135 in the address bar 172.

In some examples, referring back to FIG. 1A, instead of (or addition to) the management of content 111 that is displayed on a display 114, a voice action manager 142 may use the conversation graph 138 to identify an entity that is specified (or partly specified) in a voice command 144. For example, the microphone 136 may receive audio data 134, and the audio data 134 may specify a voice command 144. For example, the voice command 144 may specify a hotword (e.g., "ok device") followed by a command such as composing a certain message to an entity, calling a particular entity, etc. In some examples, the voice action manager 142 may use the conversation graph 138 to identify the likely entity that is subject to the command. For example, a particular voice command 144 may specify "ok device, call Tristan." However, there may be several entities named Tristan (e.g., Tristan A, Tristan B) in the existing contacts 130. The conversation graph 138 may be leveraged to determine which of the entities (e.g., Tristan A or Tristan B) is the likely entity in which the user meant to call. For example, if Tristan A is a close friend of the user, and Tristan B is an acquaintance of the user, the conversation graph 138 may have a node 156 representing an entity named Tristan A that has a relatively high familiarity metric 154. The conversation graph 138 may or may not have a node 156 representing an entity named Tristan B, and if so, may have a relatively low familiarity metric 154. In some examples, the voice action manager 142 may use the conversation graph 138 to identify that Tristan A is the subject of the voice command 144 since Tristan A is included in the conversation graph 138 and/or has a higher familiarity metric 154 than a familiarity metric 154 associated with Tristan B.

Figure 2:
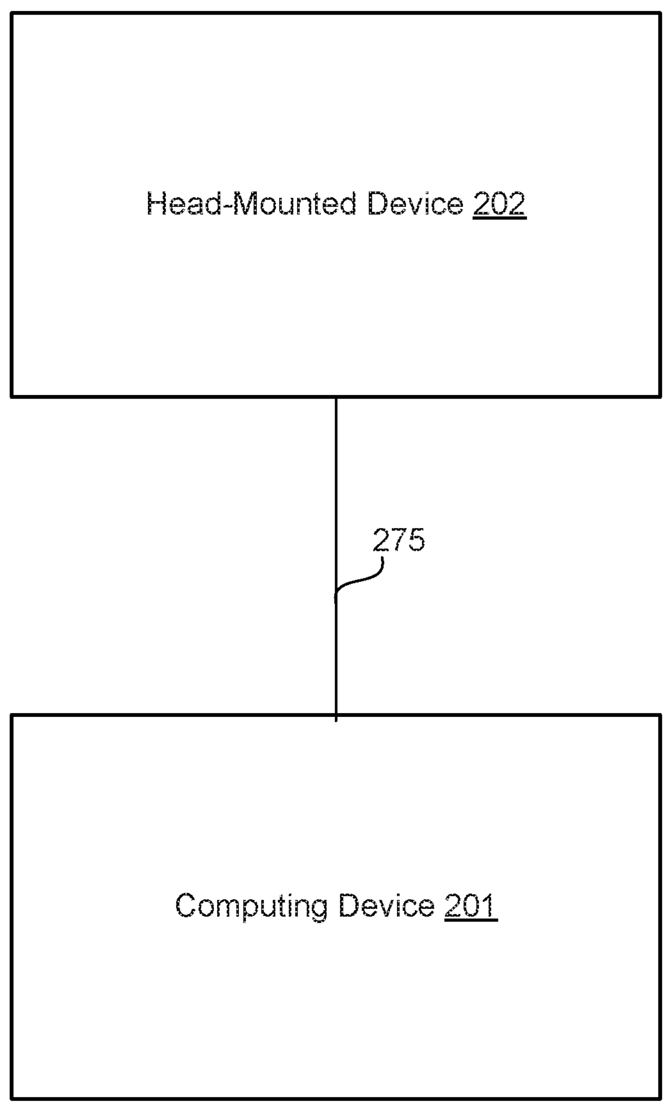
FIG. 2 illustrates a computing system for managing content using a conversation graph according to an aspect.

FIG. 2 illustrates a computing system 200 according to another aspect. The computing system 200 may include any of the features described with reference to the computing system 100 of FIGS. 1A through 1G. In some examples, the computing system 200 includes a head-mounted display device 202. In some examples, the head-mounted display device 202 includes all of the components of the computing system 100 of FIGS. 1A through 1G. For example, the head-mounted display device 202 may include the processor(s) 103, the memory device(s) 105, the imaging sensors 104, the applications 116, the image analyzer 106, the existing contacts 130, the interactive communication detector 108, the conversation graph builder 110, the conversation graph 138, the cluster detector 112, the display 114, the display manager 140, and the voice action manager 142 of FIGS. 1A through 1G.

In some examples, the computing system 200 includes the head-mounted display device 202 and a computing device 201. The computing device 201 may be connected to the head-mounted display device 202 via a wireless connection 275. In some examples, the computing device 201 includes a mobile computing device such as a smartphone, tablet, laptop, or other wearable device. In some examples, the computing device 201 includes a server computer. The server computer may be computing devices that take the form of a number of different devices, for example a standard server, a group of such servers, or a rack server system. In some examples, the server computer may be a single system sharing components such as processors and memories. In some examples, the wireless connection 275 is a short-range communication link such as near-field communication (NFC) connection or Bluetooth connection. In some examples, the wireless connection 275 is a network connection such as a local area network (LAN), a wide area network (WAN), a cellular network, satellite network, or other types of data networks. In some examples, the wireless connection 275 may include any number of computing devices (e.g., computer, servers, routers, network switches, etc.) that are configured to receive and/or transmit data within a network.

In some examples, some of the components of the computing system 100 of FIGS. 1A through 1G are included in the head-mounted display device 202, and some of the components of the computing system 100 of FIGS. 1A through 1G are included in the computing device 201. In some examples, the sensor components are included in the head-mounted display device 202 such as the imaging sensors 104 and the microphone 136 of FIG. 1A. Also, the head-mounted display device 202 may include the display 114, the processor(s) 103, the memory device(s) 105, and the applications 116 of FIGS. 1A through 1G.

In some examples, the image analyzer 106, the interactive communication detector 108, and the conversation graph builder 110 of FIG. 1A is included in the head-mounted display device 202. In some examples, one or more of the image analyzer 106, the interactive communication detector 108, or the conversation graph builder 110 is included in the computing device 201, where the sensor data (e.g., the image data 113 and the audio data 134) are transmitted to the computing device 201 over the wireless connection 275, and the computing device 201 constructs the conversation graph 138. In some examples, the cluster detector 112 is included in the head-mounted display device 202. In some examples, the cluster detector 112 is included in the computing device 201, where the conversation graph 138 may be periodically transmitted to the computing device 201 over the wireless connection 275 to detect the cluster groups 160. In some examples, the display manager 140 of FIG. 1A is included in the head-mounted display device 202. In some examples, the display manager 140 of FIG. 1A is included in the computing device 201. In some examples, the voice action manager 142 is included in the head-mounted display device 202. In some examples, the voice action manager 142 is included in the computing device 201.

Figure 3:
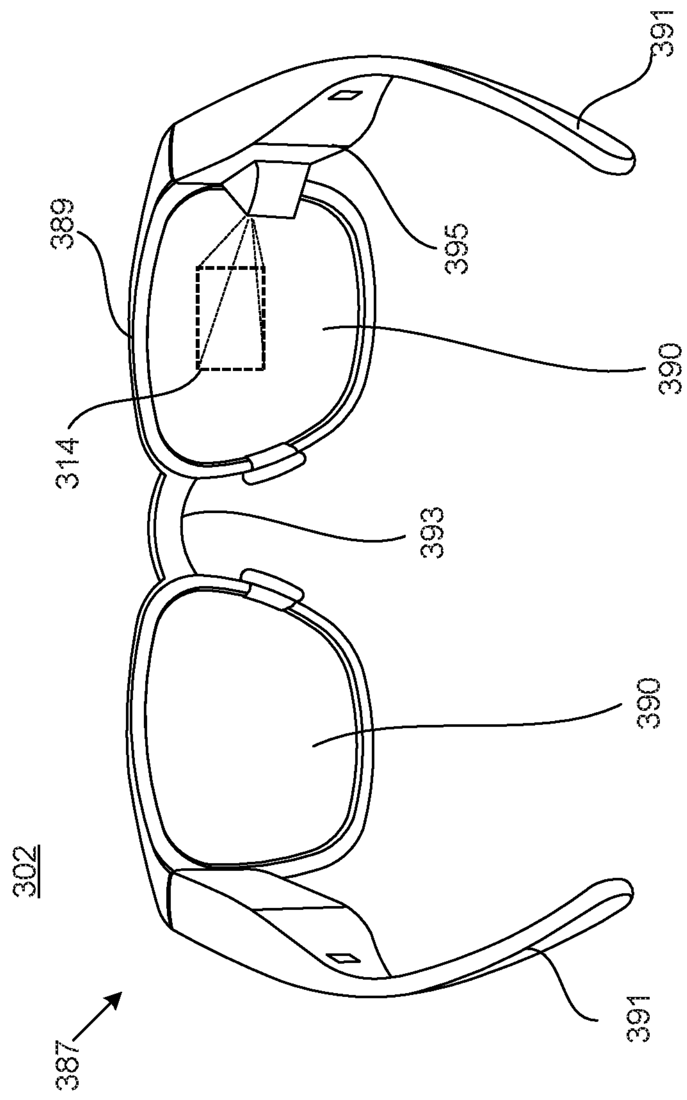
FIG. 3 illustrates an example of a head-mounted display device according to an aspect.

FIG. 3 illustrates an example of a head-mounted display device 302 according to an aspect. The head-mounted display device 302 may be an example of the computing system 100 of FIGS. 1A through 1G and/or the head-mounted display device 202 of FIG. 2. The head-mounted display device 302 includes smartglasses 387. Smartglasses 387 are glasses that add information (e.g., project a display 314) alongside what the wearer views through the glasses. In some examples, instead of projecting information, the display 314 is an in-lens micro display. In some examples, smartglasses 387 (e.g., eyeglasses or spectacles), are vision aids, including lenses 390 (e.g., glass or hard plastic lenses) mounted in a frame 389 that holds them in front of a person's eyes, typically utilizing a bridge 393 over the nose, and legs 391 (e.g., temples or temple pieces) which rest over the ears. The smartglasses 387 include an electronics component 395 that includes circuitry of the smartglasses 387. In some examples, the electronics component 395 includes a housing that encloses the components of the computing system 100 of FIGS. 1A through 1G and/or the components of the head-mounted display device 202 of FIG. 2. In some examples, the electronics component 395 is included or integrated into one of the legs 391 (or both of the legs 391) of the smartglasses 387.

Figure 4:
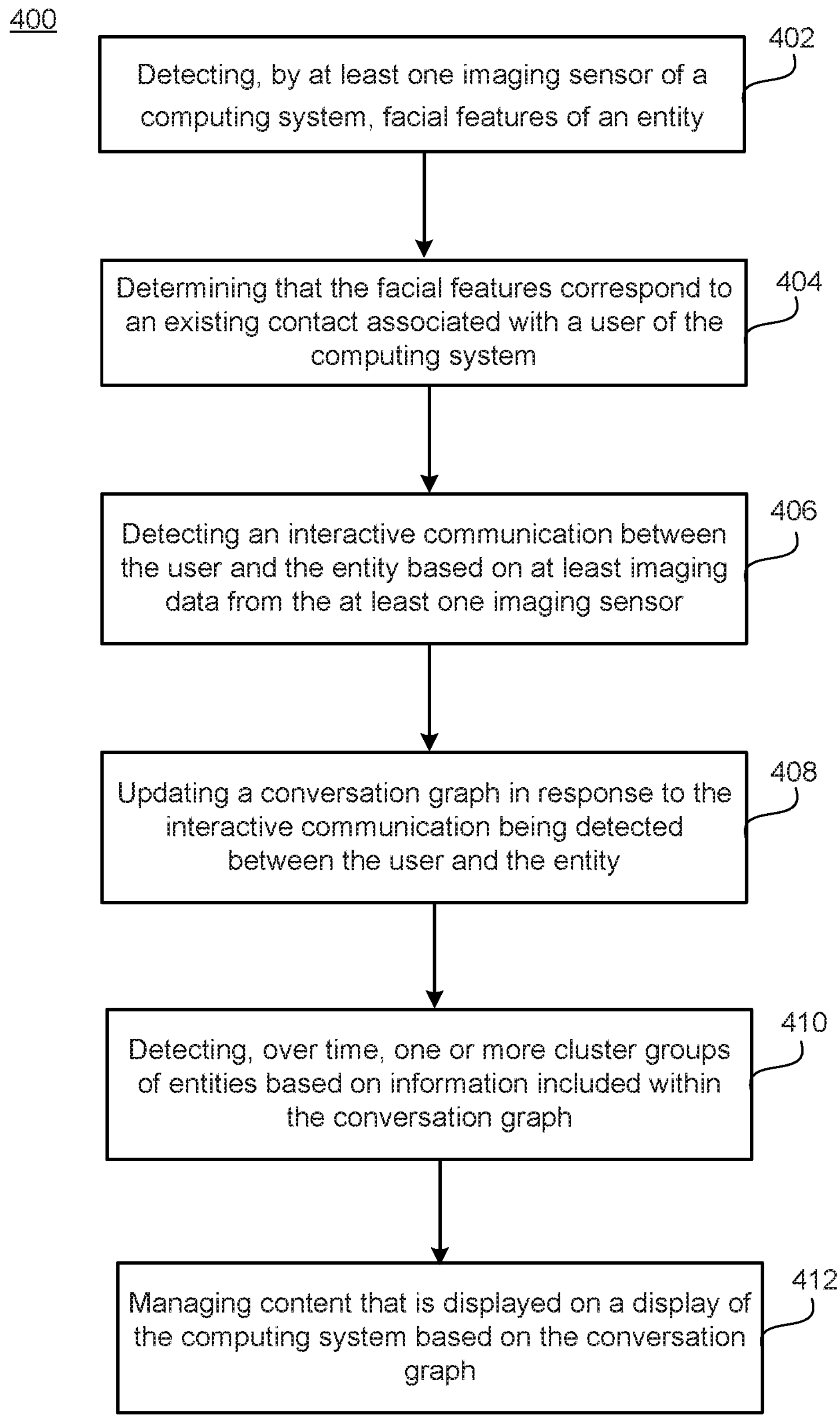
FIG. 4 illustrates a flowchart depicting example operations of a computing system according to an aspect.

FIG. 4 is a flowchart 400 depicting example operations of the computing system 100 of FIGS. 1A through 1G. Although the flowchart 400 of FIG. 4 is explained with respect to the computing system 100 of FIGS. 1A through 1G, the flowchart 400 may be applicable to any of the embodiments discussed herein including the computing system 200 of FIG. 2 and/or the head-mounted display device 302 of FIG. 3. Although the flowchart 400 of FIG. 4 illustrates the operations in sequential order, it will be appreciated that this is merely an example, and that additional or alternative operations may be included. Further, operations of FIG. 4 and related operations may be executed in a different order than that shown, or in a parallel or overlapping fashion.

Operation 402 includes detecting, by at least one imaging sensor 104 of a computing system 100, facial features of an entity. Operation 404 includes determining that the facial features correspond to an existing contact 130 associated with a user of the computing system 100. In some examples, the flowchart 400 does not include operation 404, but rather after the facial feature are detected, the operations proceed to operation 406.

Operation 406 includes detecting an interactive communication 109 between the user and the entity based on at least imaging data 113 from the at least one imaging sensor 104. Operation 408 includes updating a conversation graph 138 in response to the interactive communication 109 being detected between the user and the entity.

Operation 410 includes detecting, over time, one or more cluster groups 160 of entities based on information included within the conversation graph 138. Operation 412 includes managing content 111 that is displayed on a display 114 of the computing system 100 based on the conversation graph 138.

Figure 5:
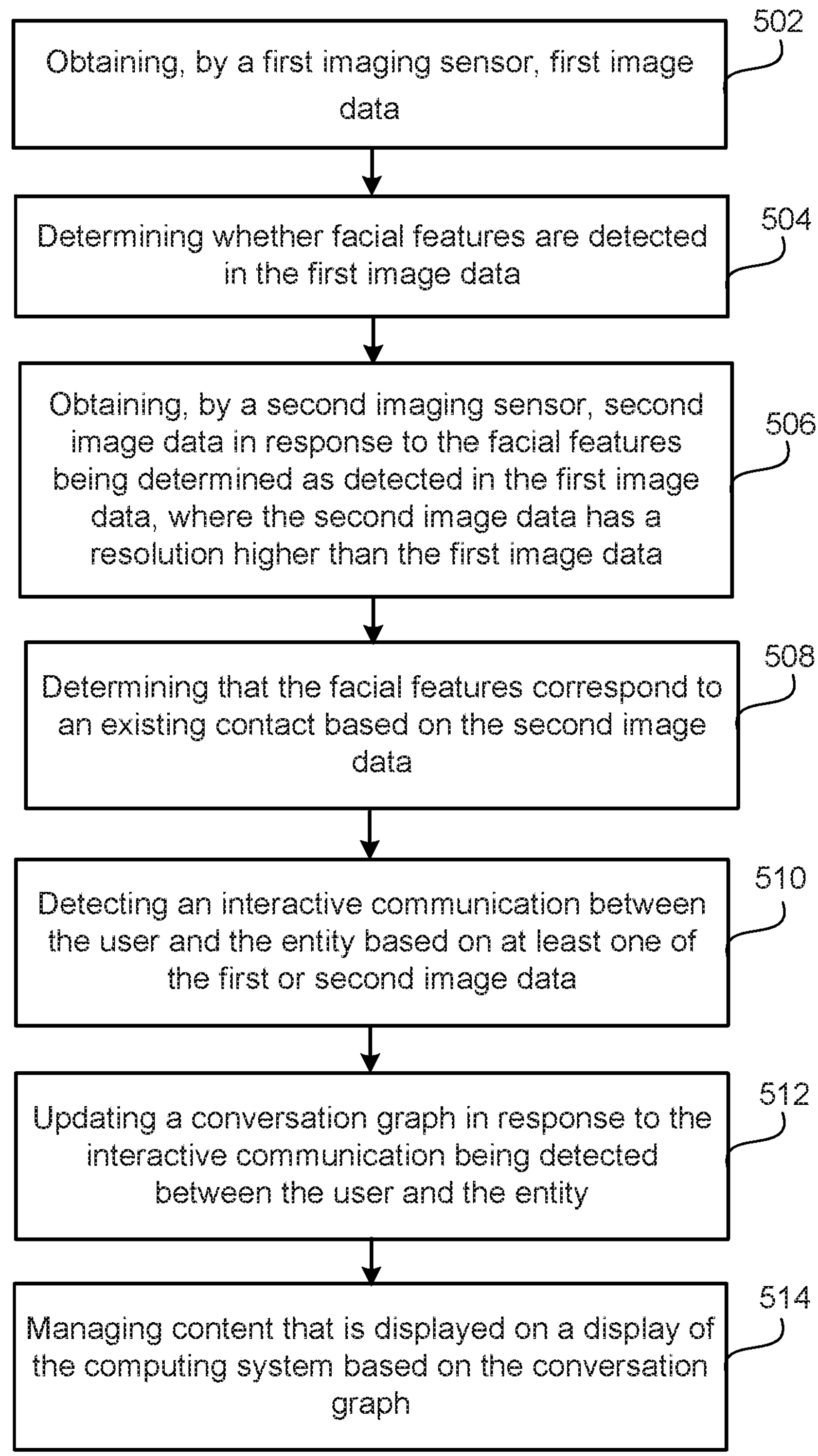
FIG. 5 illustrates a flowchart depicting example operations of a computing system according to another aspect.

FIG. 5 is a flowchart 500 depicting example operations of the computing system 100 of FIGS. 1A through 1G. Although the flowchart 500 of FIG. 5 is explained with respect to the computing system 100 of FIGS. 1A through 1G, the flowchart 500 may be applicable to any of the embodiments discussed herein including the computing system 200 of FIG. 2 and/or the head-mounted display device 302 of FIG. 3. Although the flowchart 500 of FIG. 5 illustrates the operations in sequential order, it will be appreciated that this is merely an example, and that additional or alternative operations may be included. Further, operations of FIG. 5 and related operations may be executed in a different order than that shown, or in a parallel or overlapping fashion.

Operation 502 includes obtaining, by a first imaging sensor 104*a*, first image data. Operation 504 includes determining whether facial features are detected in the first image data.

Operation 506 includes obtaining, by a second imaging sensor 104*b*, second image data in response to the facial features being determined as detected in the first image data, where the second image data has a resolution higher than the first image data. Operation 508 includes determining that the facial features correspond to an existing contact 130 based on the second image data.

Operation 510 includes detecting an interactive communication 109 between the user and the entity based on at least one of the first or second image data. Operation 512 includes updating a conversation graph 138 in response to the interactive communication 109 being detected between the user and the entity. Operation 514 includes managing content 111 that is displayed on a display 114 of the computing system 100 based on the conversation graph 138.

Figure 6:
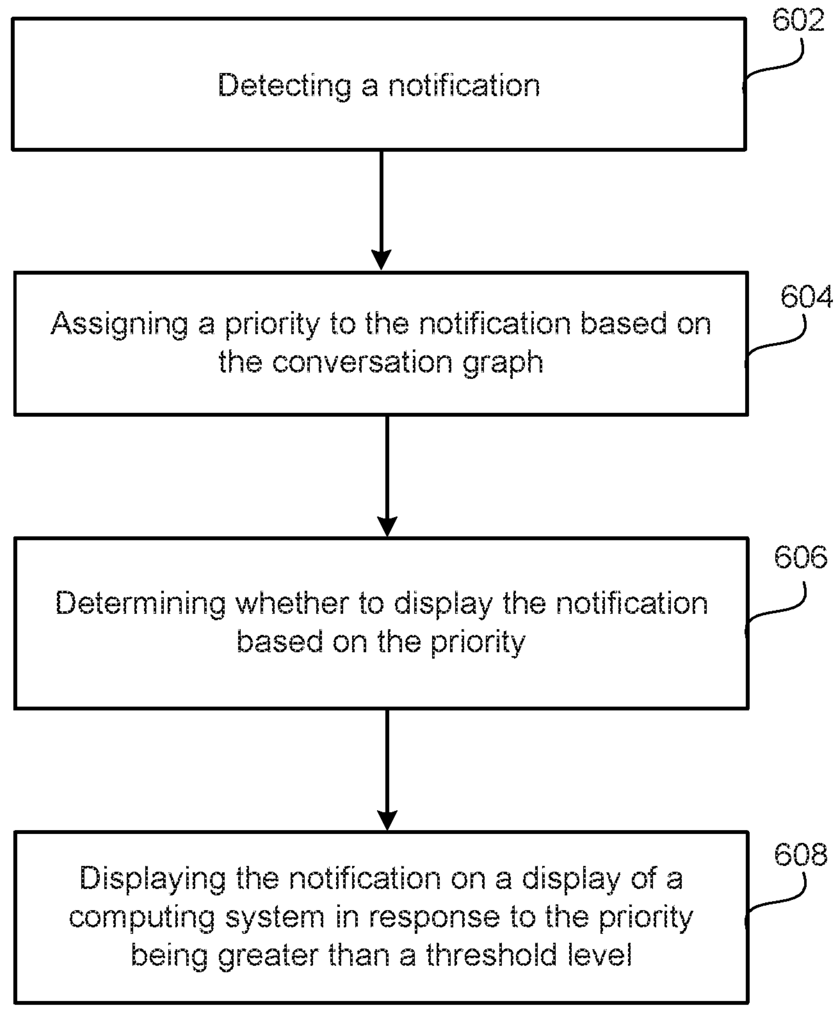
FIG. 6 illustrates a flowchart depicting example operations for managing notifications using a conversation graph according to an aspect.

FIG. 6 is a flowchart 600 depicting example operations of the computing system 100 of FIGS. 1A through 1G. Although the flowchart 600 of FIG. 6 is explained with respect to the computing system 100 of FIGS. 1A through 1G, the flowchart 600 may be applicable to any of the embodiments discussed herein including the computing system 200 of FIG. 2 and/or the head-mounted display device 302 of FIG. 3. Although the flowchart 600 of FIG. 6 illustrates the operations in sequential order, it will be appreciated that this is merely an example, and that additional or alternative operations may be included. Further, operations of FIG. 6 and related operations may be executed in a different order than that shown, or in a parallel or overlapping fashion.

Operation 602 includes detecting a notification 132. Operation 604 includes assigning a priority 162 to the notification 132 based on the conversation graph 138. Operation 606 includes determining whether to display the notification 132 based on the priority 162. Operation 608 includes displaying the notification 132 on a display 114 of a computing system 100 in response to the priority 162 being greater than a threshold level.

Figure 7:
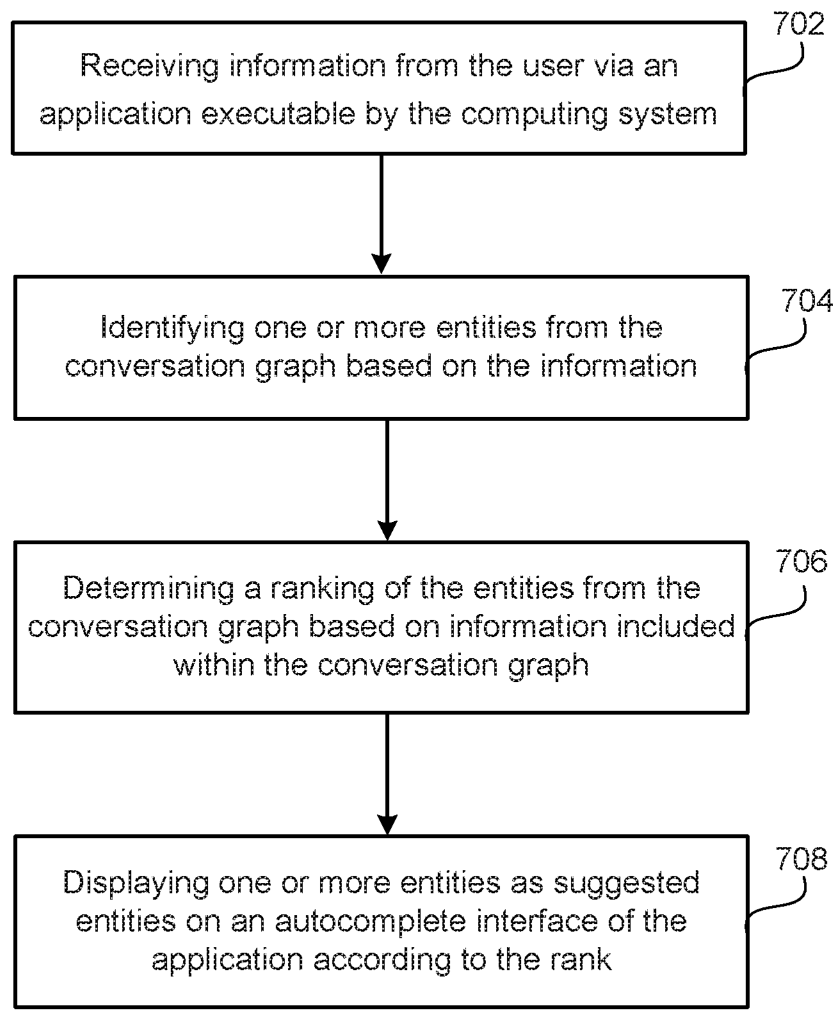
FIG. 7 illustrates a flowchart depicting example operations for ranking entities in a conversation graph according to an aspect.

FIG. 7 is a flowchart 700 depicting example operations of the computing system 100 of FIGS. 1A through 1G. Although the flowchart 700 of FIG. 7 is explained with respect to the computing system 100 of FIGS. 1A through 1G, the flowchart 700 may be applicable to any of the embodiments discussed herein including the computing system 200 of FIG. 2 and/or the head-mounted display device 302 of FIG. 3. Although the flowchart 700 of FIG. 7 illustrates the operations in sequential order, it will be appreciated that this is merely an example, and that additional or alternative operations may be included. Further, operations of FIG. 7 and related operations may be executed in a different order than that shown, or in a parallel or overlapping fashion.

Operation 702 includes receiving information from the user via an application 116 executable by the computing system 100. Operation 704 includes identifying one or more entities from the conversation graph 138 based on the information. Operation 706 includes determining a ranking of the entities from the conversation graph 138 based on information included within the conversation graph 138. Operation 708 includes displaying one or more entities as suggested entities 135 on an autocomplete interface of the application 116 according to the rank.

Figure 8:
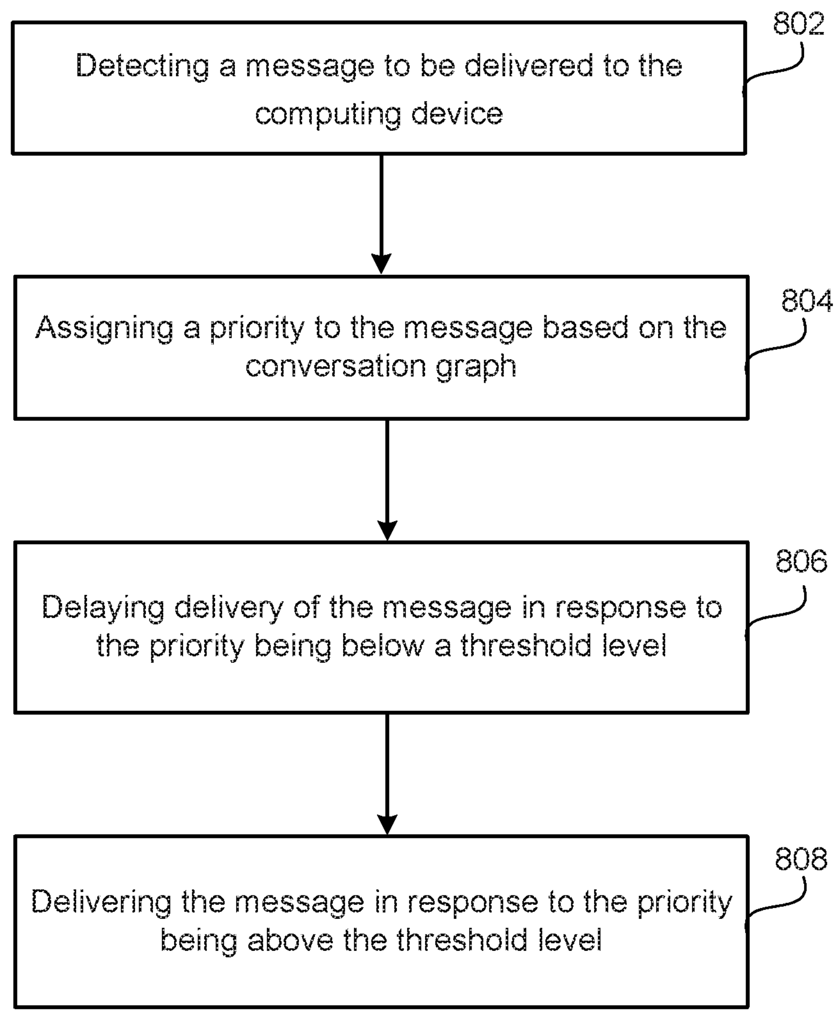
FIG. 8 illustrates a flowchart depicting example operations for managing messages using a conversation graph according to an aspect.

FIG. 8 is a flowchart 800 depicting example operations of the computing system 100 of FIGS. 1A through 1G. Although the flowchart 800 of FIG. 8 is explained with respect to the computing system 100 of FIGS. 1A through 1G, the flowchart 800 may be applicable to any of the embodiments discussed herein including the computing system 200 of FIG. 2 and/or the head-mounted display device 302 of FIG. 3. Although the flowchart 800 of FIG. 8 illustrates the operations in sequential order, it will be appreciated that this is merely an example, and that additional or alternative operations may be included. Further, operations of FIG. 8 and related operations may be executed in a different order than that shown, or in a parallel or overlapping fashion.

Operation 802 includes detecting a message 133 to be delivered to the computing system 100. Operation 804 includes assigning a priority 163 to the message 133 based on the conversation graph 138. Operation 806 includes delaying delivery of the message 133 in response to the priority 163 being below a threshold level. Operation 808 includes delivering the message 133 in response to the priority 163 being above the threshold level.

Figure 9:
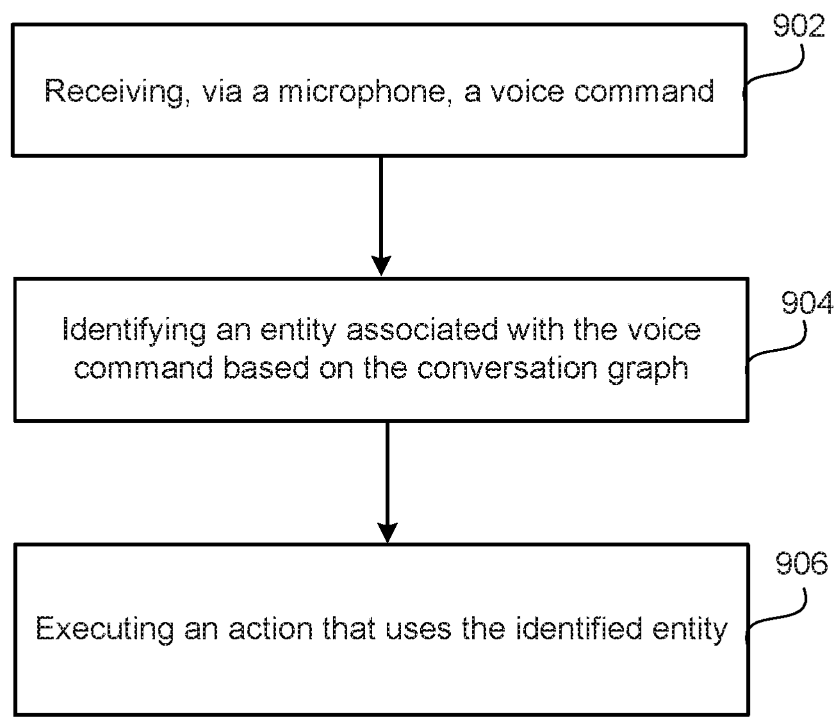
FIG. 9 illustrates a flowchart depicting example operations for identifying an entity in a voice command using a conversation graph according to an aspect.

FIG. 9 is a flowchart 900 depicting example operations of the computing system 100 of FIGS. 1A through 1G. Although the flowchart 900 of FIG. 9 is explained with respect to the computing system 100 of FIGS. 1A through 1G, the flowchart 900 may be applicable to any of the embodiments discussed herein including the computing system 200 of FIG. 2 and/or the head-mounted display device 302 of FIG. 3. Although the flowchart 900 of FIG. 9 illustrates the operations in sequential order, it will be appreciated that this is merely an example, and that additional or alternative operations may be included. Further, operations of FIG. 9 and related operations may be executed in a different order than that shown, or in a parallel or overlapping fashion.

Operation 902 includes receiving, via a microphone 136, a voice command 144. Operation 904 includes identifying an entity associated with the voice command 144 based on the conversation graph 138. Operation 906 includes executing an action that uses the identified entity.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In this specification and the appended claims, the singular forms "a," "an" and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B. Further, connecting lines or connectors shown in the various figures presented are intended to represent exemplary functional relationships and/or physical or logical couplings between the various elements. Many alternative or additional functional relationships, physical connections or logical connections may be present in a practical device. Moreover, no item or component is essential to the practice of the embodiments disclosed herein unless the element is specifically described as “essential” or “critical”.

Terms such as, but not limited to, approximately, substantially, generally, etc. are used herein to indicate that a precise value or range thereof is not required and need not be specified. As used herein, the terms discussed above will have ready and instant meaning to one of ordinary skill in the art.

Moreover, use of terms such as up, down, top, bottom, side, end, front, back, etc. herein are used with reference to a currently considered or illustrated orientation. If they are considered with respect to another orientation, it should be understood that such terms must be correspondingly modified.

Further, in this specification and the appended claims, the singular forms “a,” “an” and “the” do not exclude the plural reference unless the context clearly dictates otherwise. Moreover, conjunctions such as “and,” “or,” and “and/or” are inclusive unless the context clearly dictates otherwise. For example, “A and/or B” includes A alone, B alone, and A with B.

Although certain example methods, apparatuses and articles of manufacture have been described herein, the scope of coverage of this patent is not limited thereto. It is to be understood that terminology employed herein is for the purpose of describing particular aspects, and is not intended to be limiting. On the contrary, this patent covers all methods, apparatus and articles of manufacture fairly falling within the scope of the claims of this patent.

What is claimed is:

1. A method comprising:

obtaining, by a first imaging sensor on a wearable device, first image data;

determining whether the first image data includes a presence of facial features of an entity;

obtaining, by a second imaging sensor on the wearable device, second image data in response to the presence of facial features being determined as included in the first image data, the second image data having a resolution higher than the first image data;

detecting an interactive communication between a user of the wearable device and the entity based on;

updating a conversation graph in response to the interactive communication being detected between the user and the entity; and managing content for display on the wearable device based on the conversation graph.

2. The method of claim 1, wherein the entity is a first entity, the method further comprising:

receiving, via a microphone of the wearable device, a voice command from the user;

identifying a second entity associated with the voice command based on the conversation graph; and executing an action that uses the second entity.

3. The method of claim 1, further comprising:

determining that the facial features correspond to an existing contact associated with the user of the wearable device; and in response to the facial features being determined as corresponding to the existing contact, detecting whether the interactive communication is occurring between the user of the wearable device and the entity based on the second image data.

4. The method of claim 1, wherein the interactive communication is detected based on the second image data and audio data received via a microphone of the wearable device.

5. The method of claim 1, wherein the conversation graph includes a plurality of nodes including a first node and a second node, the first node representing the user of the wearable device, the second node representing the entity, the conversation graph including a link connected between the first node and the second node.

6. The method of claim 5, further comprising:

calculating a familiarity metric based on at least a frequency of detected interactive communications between the user and the entity; and annotating the link or the second node with the familiarity metric.

7. The method of claim 5, wherein the updating includes:

adjusting a familiarity metric in response to the interactive communication being detected between the user and the entity.

8. The method of claim 7, wherein the familiarity metric is also adjusted based on a detected virtual communication between the user and the entity.

9. The method of claim 5, wherein the updating includes:

creating a new node in the conversation graph in response to the interactive communication being detected between the user and the entity, the new node representing the entity; and creating a new link in the conversation graph between the new node and the first node, the new link or the new node being annotated with a familiarity metric representing a level of familiarity between the user and the entity.

10. The method of claim 5, further comprising:

detecting a cluster group of entities among a plurality of entities based on information included within the conversation graph;

identifying that the content is associated with an entity; and determining whether to display the content on the wearable device based on whether the entity associated with the content is included within the cluster group of entities.

11. The method of claim 1, wherein the managing includes:

detecting a notification generated by an application executable by the wearable device;

assigning a priority to the notification based on the conversation graph; and determining whether to display the notification on the wearable device based on the assigned priority.

12. The method of claim 11, further comprising:

determining that the notification is related to an entity included within the conversation graph, wherein the assigning includes assigning a priority to the notification higher than a priority assigned to a notification that relates to an entity not included within the conversation graph.

13. The method of claim 1, further comprising:

detecting a message to be delivered to the wearable device;

assigning a priority to the message based on the conversation graph;

delaying or not delivering the message in response to the priority being below a threshold level; and delivering the message in response to the priority being above the threshold level.

14. The method of claim 1, wherein the wearable device includes smartglasses.

15. A method comprising:

detecting, by at least one imaging sensor of a wearable device, facial features of an entity;

detecting an interactive communication between a user of the wearable device and the entity based on at least image data from the at least one imaging sensor;

updating a conversation graph in response to the interactive communication being detected between the user and the entity; and managing content for display on the wearable device based on the conversation graph, including:

receiving information from the user via an application executable by the wearable device;

identifying at least one entity from the conversation graph based on the information; and providing the at least one entity as a suggested entity for display on an interface of the application.

16. The method of claim 15, further comprising:

determining a ranking of a plurality of entities from the conversation graph based on a familiarity metric associated with one or more of the plurality of entities, wherein one or more of the plurality of entities are displayed as suggested entities according to the ranking.

17. A non-transitory computer-readable medium storing executable instructions that when executed by at least one processor are configured to cause the at least one processor to execute operations, the operations comprising:

obtaining, by a first imaging sensor on a wearable device, first image data;

determining whether the first image data includes a presence of facial features of an entity:

obtaining, by a second imaging sensor on the wearable device, second image data in response to the presence of facial features being determined as included in the first image data, the second image data having a resolution higher than the first image data;

detecting an interactive communication between a user of the wearable device and the entity based on the second image data;

updating a conversation graph in response to the interactive communication being detected between the user and the entity, including:

calculating a familiarity metric associated with the entity; and annotating a node or link with the familiarity metric, the conversation graph including a plurality of nodes representing entities and links connected between the plurality of nodes; and managing content for display on the wearable device based on the conversation graph.

18. The non-transitory computer-readable medium of claim 17, wherein the operations comprise:

determining that the facial features correspond to an existing contact associated with the user of the wearable device, wherein, in response to the facial features being determined as corresponding to the existing contact, the second image data and audio data received via a microphone on the wearable device are used to detect a presence of the interactive communication.

19. The non-transitory computer-readable medium of claim 17, wherein the entity is a first entity, wherein the operations further comprise:

receiving, via a microphone of the wearable device, a voice command from the user;

identifying a second entity associated with the voice command based on the conversation graph; and executing an action that uses the second entity.

20. A wearable device comprising:

a first imaging sensor configured to receive first image data;

a second imaging sensor configured to receive second image data, the second image data having a resolution higher than a resolution of the first image data;

an image analyzer configured to detect a presence of facial features of an entity in the first image data and activate the second imaging sensor to obtain the second image data in response to the facial features in the first image data being detected, the image analyzer configured to use the second image data to determine that the facial features correspond to an existing contact associated with a user of the wearable device;

an interactive communication detector configured to detect an interactive communication between the user and the entity based on at least one of the first image data or the second image data;

a conversation graph builder configured to update a conversation graph in response to the interactive communication being detected between the user and the entity; and a display manager configured to manage content that is displayed on a display of the wearable device based on the conversation graph.

21. The wearable device of claim 20, wherein the conversation graph includes a plurality of nodes representing entities and links connected between the plurality of nodes, wherein the conversation graph builder is configured to calculate a familiarity metric associated with the entity and annotate a node or link with the familiarity metric.

22. The wearable device of claim 20, wherein the display manager includes a notification manager configured to manage a display of notifications based on the conversation graph, wherein the wearable device further comprising:

a cluster detector configured to detect a cluster group of entities among a plurality of entities based on information included within the conversation graph, wherein the notification manager is configured to identify that a notification is associated with an entity and assign a priority to the notification based on whether the entity associated with the notification is included within the cluster group of entities.

* * * * *